(12) United States Patent
Kuo et al.

(10) Patent No.: US 12,003,386 B2
(45) Date of Patent: *Jun. 4, 2024

(54) METHOD FOR ENHANCING QUALITY OF MEDIA

(71) Applicant: Kabushiki Kaisha Ubitus, Tokyo (JP)

(72) Inventors: Jung-Chang Kuo, Taipei (TW); Wen-Kae Tsao, Taipei (TW); Ying-Hau Wu, Taipei (TW)

(73) Assignee: Kabushiki Kaisha Ubitus, Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 17/485,461

(22) Filed: Sep. 26, 2021

(65) Prior Publication Data

US 2022/0014447 A1 Jan. 13, 2022

Related U.S. Application Data

(63) Continuation-in-part of application No. 16/782,667, filed on Feb. 5, 2020, now Pat. No. 11,290,345, which is a continuation-in-part of application No. 16/376,877, filed on Apr. 5, 2019, now Pat. No. 10,574,537, which is a continuation of application No. 16/027,022, filed on Jul. 3, 2018, now Pat. No. 10,284,432.

(51) Int. Cl.
*H04L 41/16* (2022.01)
*G06N 3/088* (2023.01)
*H04L 41/14* (2022.01)
*H04L 65/70* (2022.01)
*H04L 65/75* (2022.01)
*H04L 65/80* (2022.01)
*H04L 67/01* (2022.01)

(52) U.S. Cl.
CPC .............. *H04L 41/16* (2013.01); *G06N 3/088* (2013.01); *H04L 41/145* (2013.01); *H04L 65/70* (2022.05); *H04L 65/75* (2022.05); *H04L 65/765* (2022.05); *H04L 65/80* (2013.01); *H04L 67/01* (2022.05)

(58) Field of Classification Search
CPC ......... H04L 41/16; H04L 65/70; H04L 65/75; H04L 65/80; H04L 67/01; G06N 3/088
See application file for complete search history.

(56) References Cited

U.S. PATENT DOCUMENTS 11,290,345 B2 * 3/2022 Kuo ...................... H04L 41/145

\* cited by examiner

*Primary Examiner* — Kristie D Shingles

(57) ABSTRACT

A method for enhancing quality of media uses an artificial intelligence (AI) enhancing model built-in the client device to enhance the quality of video streams. The AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images. Such that, the enhanced images are visually more similar to the raw images than the decoded images do.

16 Claims, 27 Drawing Sheets

METHOD FOR ENHANCING QUALITY OF MEDIA

RELATED CASES

This is a continuation-in-part of co-pending Ser. No. 16/782,667 filed on Feb. 5, 2020, which is a continuation-in-part of Ser. No. 16/376,877 filed on Apr. 5, 2019, which is a continuation of Ser. No. 16/027,022 filed on Jul. 3, 2018, whose disclosures are incorporated by this reference as though fully set forth herein.

BACKGROUND OF INVENTION

1. Field of the Invention

The invention relates to a method for enhancing quality of media, especially refers to a method for enhancing quality of images by using a pre-trained AI (artificial intelligence) enhancing model built-in the client device.

2. Description of the Prior Art

During the past years, online games have become more and more popular all over the world. With the development of cloud computing related systems and technologies, a technology for allowing a server to stream the game contents to provide services has been introduced.

A conventional way to provide such cloud-based online game service is to let the server do almost all of the calculations. Which means, when providing the online game service, a typical application is executed on the server to generate a virtual 3D environment containing multiple 3D objects including which can be controlled or moved by players. And then, based on the controlling result of the player, the server renders the virtual 3D environment together with the 3D objects into a 2D game screen to be shown on the payer's device. And then, the server encodes and transmits the rendered images to the player's device as a 2D video stream. The player's device then only needs to decode and "display" the 2D video stream, without the need to do the calculations of the 3D rendering. However, there are several issues to be considered when providing such cloud-based online game service, for example, high loading of the server for performing 3D rendering processes for a large number of players in the same time, degraded quality of graphical result caused by the encoding and streaming processes, and considerable consumption of communication bandwidth for transmitting the 2D video streams via the network.

One conventional approach to resolve the problem of degraded graphical quality is to increase the resolution of the raw images generated by the gaming application at the server side, and also to increase the transmission bitrate of images, that is, to decrease the compression ratio of the images when the server is encoding those raw images into 2D video stream. However, it is obvious that the loading of the server as well as the bandwidth consumption will both be severely increased due to higher resolution and transmission bitrate of images. For example, if the frame rate and encoding compression ratio are fixed, then, when the resolution of the raw images generated by the gaming application at the server side is increased from 720p to 1080p, then the transmission bitrate required and the calculation loading of server will also be increased 2.25 times. In the other hand, if we try to decrease the bandwidth consumption and loading of the server, then the quality of graphical result of gaming images will also be sacrificed. It becomes a dilemma when trying to maintain perfect image quality and economic bandwidth consumption in the same time.

Another approach to resolve such problem is either to use a lower resolution for the raw images generated by the gaming application at the server side, or to use a higher compression ratio for encoding the raw images into the 2D video stream, or both. Such that, the bandwidth consumption for transmitting the 2D video streams via the network can be decreased, although the quality of graphical result of gaming images is sacrificed. In the meantime, an image enhancing technology is employed in the client device. Once the client device receives the 2D video streams, the client device decodes the video streams and uses the image enhancing technology to improve the visual effects of images. Histogram equalization (HE) is one of the most popular image enhancement methods for enhancing image contrast owing to its simplicity and effectiveness. However, HE may cause excessive contrast enhancement and feature loss problems that result in an unnatural look and loss in details of the processed images. In addition, not only HE but also all other image enhancing technologies known in the art are encountering the same predicament, that is, they all try to use one single set of algorithms to handle various kinds of images having completely different graphical contents, and such idea is unfeasible. Taking cloud-based online game service as an example, graphical contents of raw images generated by the server might significantly varied when the gaming scenery is changed. For example, a gaming scenery of city might let the raw images of game to contain a plurality of buildings having simplified contours and different but generally unified colors. Another gaming scenery of dark cave might result the raw images of game to be monotonous in color with low Hue, Value and Chroma values, but have irregular yet obscure contours of landscape. A further gaming scenery of blossom garden might let the raw images of game to be full of vivid and colorful objects with detailed and complex contours. It is undoubted that, none of these image enhancing technologies known in the art can provide a good and acceptable quality of image-enhancing effect for all those various kinds of images having completely different graphical contents. Moreover, another predicament of all these image enhancing technologies known in the art is that, although the algorithms of these well-known image enhancing technologies are designed to improve the graphical effects such like contrast, sharpness, contrast and/or saturation of images, but those algorithms and parameters thereof are completely irrelevant to the original raw images. As a result, the enhancing processes performed by these well-known image enhancing technologies definitely will not make the enhanced images to be more visually similar to their corresponding raw images, and thus the game players in the client side won't be able to entirely enjoy the graphical effects that originally presented in the raw images generated by the gaming application at the server side.

SUMMARY OF THE INVENTION

Accordingly, it is the primary object of the present invention to provide a method for enhancing quality of media. The method uses an AI enhancing model built-in the client device, wherein the AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images that are generated by the server. Such that, the enhanced images are visually more similar to the raw images than the decoded images do.

It is another object of the present invention to provide a method for enhancing quality of media, which can decrease the loading of server, improve the quality of images displayed on the client device, and save the bandwidth consumption between the client device and the server.

It is a further object of the present invention to provide a method for enhancing quality of media, wherein the raw images generated by the server belong to different scene-modes, raw images of different scene-modes have different graphical contents. Decoded images corresponding to raw images of different scene-modes are processed by the same AI enhance module by using different sets of weighted parameters that are corresponding to the scene-modes. Therefore, the method of the invention can provide a good and steady quality of image-enhancing effect for all various kinds of raw images having completely different graphical contents.

In order to achieve the aforementioned objects, the invention provides a method for enhancing quality of media, comprising:

providing a client device which includes an AI enhance module; said AI enhance module comprising at least one predefined algorithm; said at least one predefined algorithm comprising a plurality of weighted parameters; said weighted parameters of the at least one predefined algorithm are defined in advance by a training process of an artificial neural network module executed in a server;

the client device accepting a plurality of encoded images;

the client device decoding said accepted encoded images into a plurality of decoded images, and using the at least one predefined algorithm and the weighted parameters to process the decoded images in order to generate a plurality of enhanced images; and the client device outputting the enhanced images to a screen as displayed output images.

In a preferred embodiment, the training process comprises:

STEP (a): starting a training mode in the server to generate a plurality of training raw images;

STEP (b): encoding said training raw images into a plurality of training encoded images by using an encoder of the server;

STEP (c): decoding said training encoded images into a plurality of training decoded images by using a training decoder of the server;

STEP (d): said artificial neural network module accepting said training decoded images and processing said training decoded images one by one by using at least one training algorithm in order to generate a plurality of training output images; said at least one training algorithm having a plurality of training weighted parameters; and STEP (e): using a compare module to compare the differences between the training output images and their corresponding training raw images one by one, so as to modify said training weighted parameters of said at least one training algorithm according to the differences between each said training output image and its corresponding training raw image; said training weighted parameters being modified to minimize the differences between the training output images and their corresponding training raw images; each time when the training weighted parameters being modified, the modified training weighted parameters being fed back to the at least one training algorithm for processing another said training decoded image in STEP (d);

wherein, after a predetermined amount of the training output images and their corresponding training raw images are compared, and a predetermined times of the training weighted parameters are modified, the training weighted parameters are applied to the at least one predefined algorithm of said AI enhance module of the client device.

In a preferred embodiment, the encoded images accepted by the client device are generated by the following steps:

executing a first application in the server; said first application generating a plurality of raw images according to at least one command; said raw images being encoded by the encoder of the server to form a plurality of encoded images;

executing a second application in the client device; the second application being relevant to and cooperative with the first application in such a manner that, the client device being operable by a user to generate said at least one command;

said client device transmitting said at least one command to the server via a network, and receiving said encoded images from the server via the network according to the command.

In a preferred embodiment, the encoded images accepted by the client device are a video e-file stored in a portable memory medium in advance and can be directly accessed by the client device to obtain the encoded images by reading the video e-file.

In a preferred embodiment, wherein:

the raw images generated by the first application are divided into a plurality of scene-modes, each said scene-mode includes a plurality of said raw images;

the weighted parameters of the AI enhance module of the client device are divided into a plurality of sets, each set includes a plurality of said weighted parameters and is corresponding to one of the scene-mode;

said decoded images corresponding to raw images of different said scene-modes are processed by the same AI enhance module by using weighted parameters of different said sets that are corresponding to the scene-modes;

wherein, said weighted parameters of said sets are pre-stored in either the client device or the sever;

when said weighted parameters of said sets are all pre-stored in the client device, whenever the scene-mode changes, a different set of weighted parameters corresponding to said scene-mode will be applied to the AI enhance module for generating the enhanced images;

when said weighted parameters of said sets are pre-stored in the server, whenever the scene-mode changes, a different set of weighted parameters corresponding to said scene-mode will be downloaded from the server to the client device, and then applied to the AI enhance module for generating the enhanced images.

In a preferred embodiment, wherein:

in the training mode, the training raw images are high quality images and meet at least one or more of the following image properties: higher resolution such as 4K resolution or above, larger field of view (FOV) such as 150 degrees or above, higher frame-per-second (FPS) such as 60 FPS or above, with stereo vision, with visual depth information, with additional color information such as infrared or ultraviolet, with better audio such as multi-channel, high sampling frequency (44 khz or higher) or high resolution (audio bit depth 24 bit or above);

an additional step is further included between the STEP (a) and STEP (b): degradation of training raw images; the training raw images are degraded by using a degradation module to reduce their image quality, in order to obtain a plurality of degraded training raw images that meet one or more of the following properties: lowered resolution (down to 720p, 1080i or lower) by a sampling method, smaller FOV by a cropping method (down to 120 degree or lower, or cropping the original aspect ratio of 16:9 down to 4:3), reduced frame updating rate by a discarding method (down to 30 FPS or lower), single image retrieved from stereo vision, discarded visual depth information, discarded additional color information, converted audio to stereo dual channel, reduced sampling frequency (22.1 khz or lower), reduced resolution (16 bit or lower), added noise (Gaussian or Laplacian noises), blurred (Gaussian blur);

in STEP (b), the training encoded images are generated by using the encoder to encode the degraded training raw images.

In a preferred embodiment, in STEP (d), in the training mode, the artificial neural network module accepts several frames of the training decoded images to generate at least one frame of the training output images; in addition, in the client device, the AI enhance module accepts several frames of the decoded images to generate at least one frame of the enhanced images.

In a preferred embodiment, the artificial neural network module accepts and processes said training decoded images and an audio; in addition, the AI enhance module accepts and processes the decoded images and another audio.

In a preferred embodiment, the invention provides a method for enhancing quality of media, comprising:

using a client device to decode a plurality of encoded images, said encoded images being generated by encoding a plurality of raw images;

said client device decoding said encoded images to generate a plurality of decoded image, and using an AI enhance module to enhance quality of the decoded images in order to generate a plurality of enhanced images; wherein, said AI enhance module uses at least one predefined algorithm to process the decoded images; said at least one predefined algorithm is obtained in advance by analyzing differences between the decoded images and their corresponding said raw images; such that, the enhanced images obtained will be visually closer to the raw images than the decoded images; and the client device outputting the enhanced images to a screen as displayed output images.

All these objects are achieved by the method and system for enhancing quality of media in accordance with the present invention described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for enhancing quality of media transmitted via network uses an AI enhancing model built-in the client device to enhance the quality of video streams received from network. The AI enhance module is pre-trained by using a neural network in the server to analyze differences between the decoded images and the raw images that are generated by the server. Wherein, the AI enhance module enhances decoded images by using algorithms which are defined by analyzing differences between the decoded images and the raw images that are generated by the server. Such that, the enhanced images are visually more similar to the raw images than the decoded images do.

One use of the present invention is in cloud-based online games, where a player uses a client device to play a game on a server over a network. The server is responsive to commands by the user and generates video for the client device. Thus, for example, a user makes a move on the client device. The move is transmitted to the server device, which then recalculates an image that is transmitted back to the client device to be displayed thereon. In many games, the server generates the 2D images which include the 3D rendering of objects within the field of view.

Figure 1:
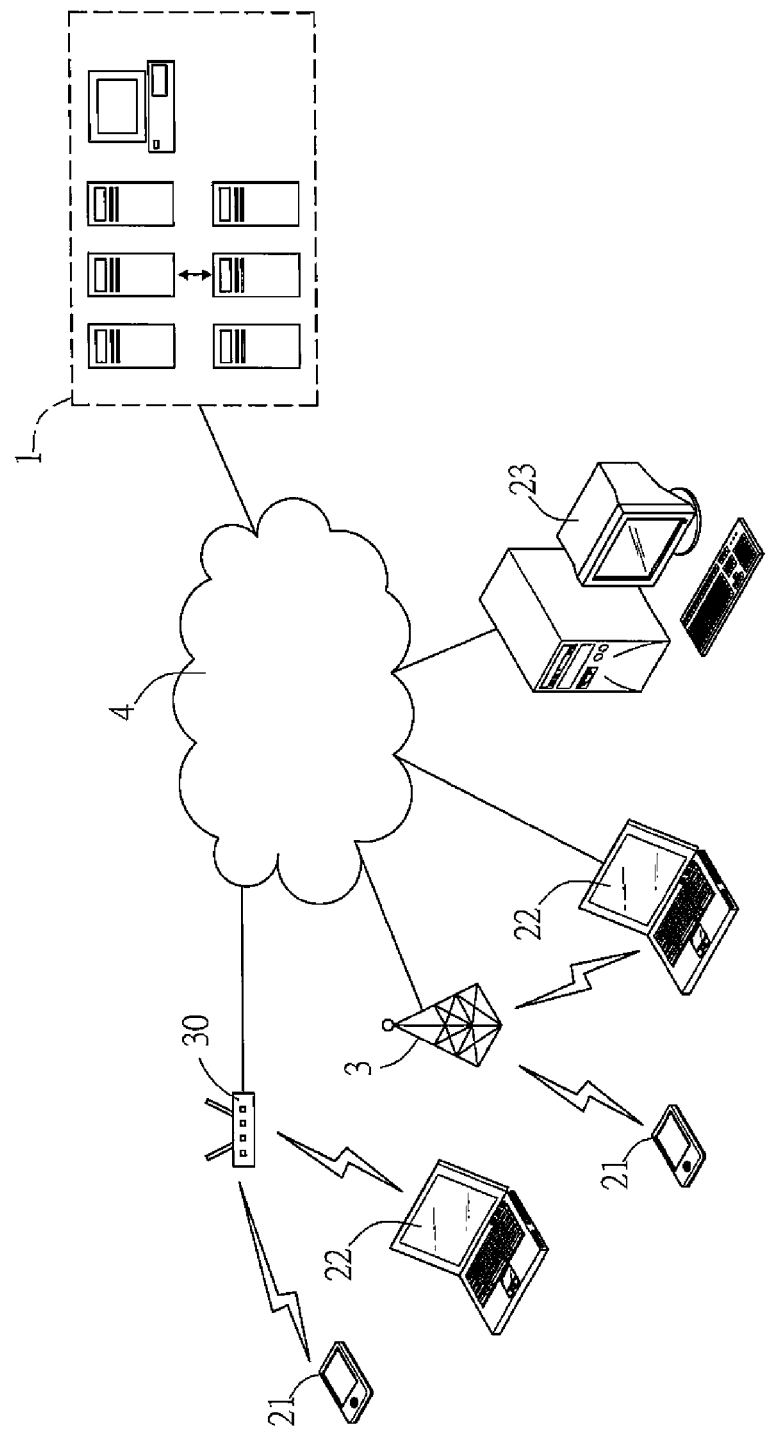
FIG. 1 is a schematic drawing illustrating a system for enhancing quality of media transmitted via network in accordance with the present invention.

Please refer to FIG. 1, which schematically illustrates a system for enhancing quality of media transmitted via network in accordance with the present invention. A server 1 is applied for providing the service of an application executed on the server 1, such service can be, but not limited to, a cloud-based online game service. A plurality of client devices 21, 22, 23 can connect (log in) to the server 1 via a network 4 to use the service provided by the application running on the server 1. In this embodiment, the network 4 is Internet, and the client devices 21, 22, 23 can be any electronic device having the ability to access the Internet, such like (but not limited to) a smart phone 21, a digital tablet, a notebook 22, a desktop computer 23, a video game player, or even a smart TV. Some of the client devices 21, 22 are connected wirelessly to the network 4 by means of a mobile station 3 or a wireless router 30, some others can be connected to the network 4 through a router in a wired manner. The application running on the server 1 generates a virtual 3D environment containing a plurality of 3D objects, some of them are movable or breakable according to the player's operations, others are not. In a preferred embodiment of the invention, for each client device, there will be one independent running instance of application. Which means, one application provides the service to one client device only, however, several applications can be executed on the same server for providing services to multiple client devices. The client device 21,22,23 connects to the server 1 via the network 4 in order to retrieve graphics containing at least some of the 3D objects generated by the application. The architecture of the system and the features thereof are illustrated in detail in FIG. 2 and its associated description.

Figure 2:
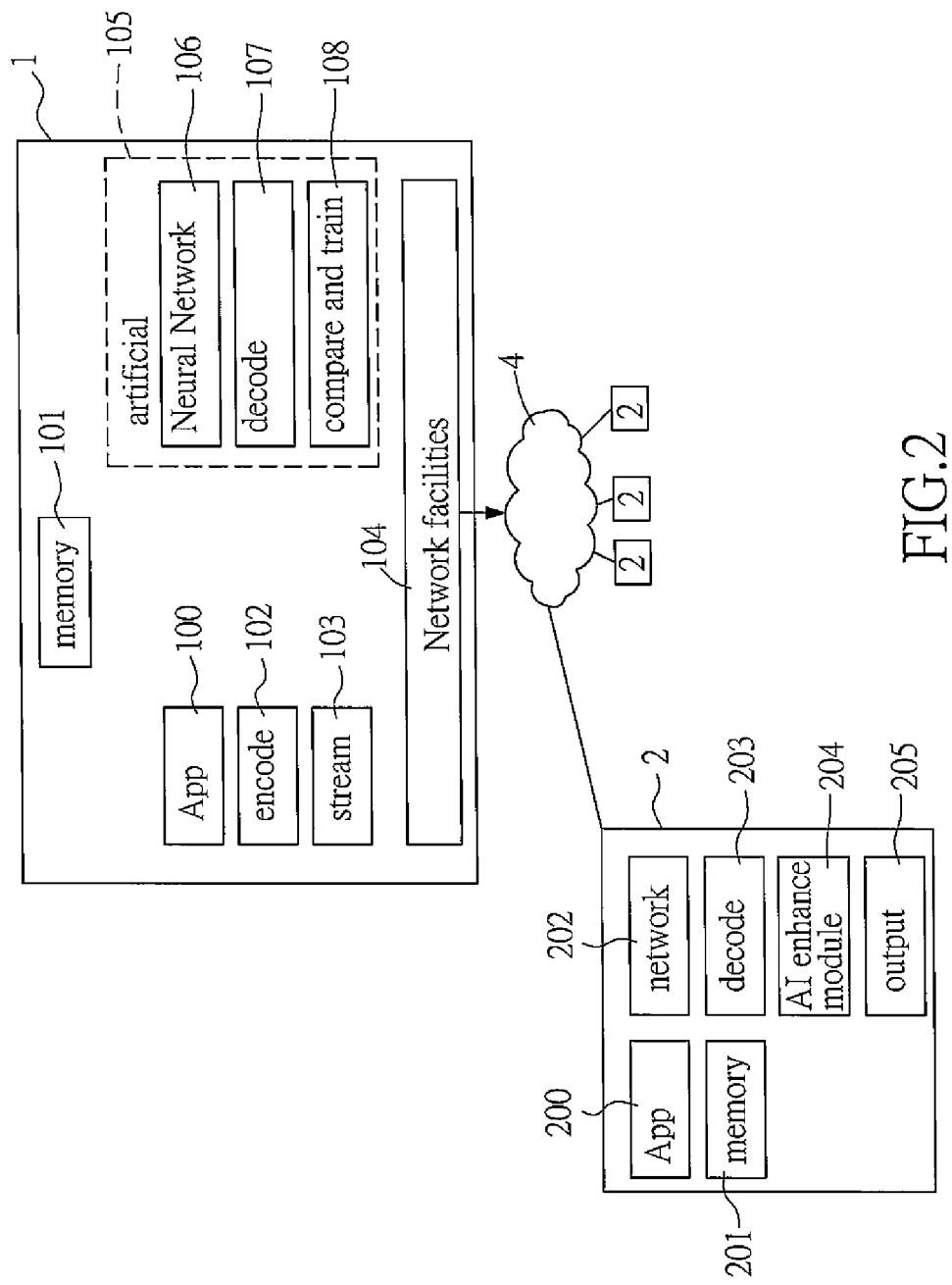
FIG. 2 is a schematic diagram showing an embodiment of a system architecture in accordance with the present invention.

FIG. 2 is a schematic diagram showing an embodiment of a system architecture in accordance with the present invention. Application (App) 100 is an application stored in the memory 101 for generating 3D graphic rendering result in the form of a series of raw images, generally a 3D game application, running on server 1. Encode 102 and stream 103 are encoding and streaming modules that can accept the raw images generated by the application 100, and encoding and streaming these raw images into a 2D video stream. The encoded 2D video stream is then transmitted via the network facilities 104 of server to the client device 2 located remote from the server 1 through the network 4. Each client device 2 is pre-installed with an application 200 which is stored in the memory 201 of client device 2 and is relevant to and cooperative with the application 100 of server 1. The application 200 of client device 2 establishes connection with the application 100 of server 1, and retrieves the encoded 2D video stream from the server 1 by using the network module 202. The retrieved 2D video stream is then decoded by a decode module 203 to generate decoded images. It is understood that, because of the processes of encoding, streaming and decoding, the qualities of decoded images are worse than the qualities of the raw images. The AI enhance module 204 built-in the client device 2 can enhance qualities of the decoded images in order to generate a plurality of enhanced images. In which, the AI enhance module 204 processes the decoded images by using at least one algorithm which is defined by analyzing differences between the decoded images and the raw images in such a manner that, the enhanced images are visually more similar to the raw images than the decoded images do. The enhanced images are then output to the screen (display panel) of client device 2 by the output module 205. In the present invention, the algorithms of the AI enhance module 204 of client device 2 is defined by a training process of an artificial neural network module 105 performed by the server 1. The artificial neural network module 105 is furnished in the server 1 and comprises: an artificial neural network 106, a decode module 107 and a compare and train module 108. Embodiments of the training process of artificial neural network module 105 in accordance with the present invention will be illustrated in detail later.

Figure 3:
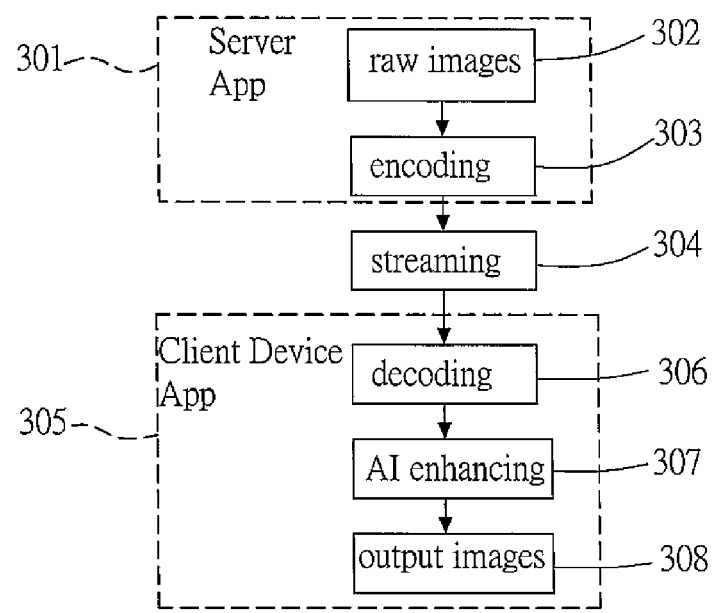
FIG. 3 is a schematic diagram showing an embodiment of the method for enhancing quality of media transmitted via network in accordance with the present invention.

FIG. 3 is a schematic diagram showing an embodiment of the method for enhancing quality of media transmitted via network in accordance with the present invention. The method, by employing the above illustrated system and architecture shown in FIGS. 2 and 3 of the invention, generally comprises the following steps:

STEP 301: executing a first application in a server. The first application generates a plurality of raw images (STEP 302) according to at least one command. The raw images are then encoded and compressed by an encoder (STEP 303) of the server to form a plurality of encoded images. The encoded images are then transmitted to a client device in the form of 2D video streaming (STEP 304) via the network.

A second application is executed in a client device remote from the server (STEP 305). The second application is relevant to and cooperative with the first application in such a manner that, the client device is operable by a user to generate the command in order to use the services provided by the first application of the server. The client device transmits the command to the server via the network, and retrieves the encoded images from the server via the network according to the command. And then, the client device decodes (STEP 306) the encoded images into a plurality of decoded images, and uses an AI enhance module (STEP 307) to enhance qualities of the decoded images in order to generate a plurality of enhanced images. Wherein, the AI enhance module processes the decoded images by using at least one algorithm which is pre-defined by analyzing differences between the decoded images and the raw images in such a manner that, the enhanced images are visually more similar to the raw images than the decoded images do. And then, the client device outputs the enhanced images (STEP 308) to the screen (display panel) as displayed output images.

In the present invention, the at least one algorithm of the AI enhance module of the client device comprises a plurality of weighted parameters. The weighted parameters are depending from the differences between the decoded images and the raw images and are defined by a training process of an artificial neural network module performed by the server. In one embodiment of the invention, the weighted parameters are pre-stored in the client device. In another embodiment, the weighted parameters are downloaded from the server to the client device when the second application is executed on the client device.

In a preferred embodiment of the invention, graphical contents of raw images generated by the server might significantly varied when the gaming scenery is changed. For example, a gaming scenery of city might let the raw images of game to contain a plurality of buildings having simplified contours and different but generally unified colors. Another gaming scenery of dark cave might result the raw images of game to be monotonous in color with low Hue, Value and Chroma values, but have irregular yet obscure contours of landscape. A further gaming scenery of blossom garden might let the raw images of game to be full of vivid and colorful objects with detailed and complex contours. The method of the invention employs different sets of weighted parameters to suit different gaming scenery, such that the quality of output images enhanced by the same AI enhance module can be maintained at a high and steady level even when the graphical contents of raw images change severely.

Preferably, the raw images generated by the first application are divided into a plurality of scene-modes, each scene-mode includes a plurality of raw images. The weighted parameters are divided into a plurality of sets, each set includes a plurality of weighted parameters and is corresponding to one of the scene-mode. The decoded images corresponding to raw images of different scene-modes are processed by the same AI enhance module by using weighted parameters of different sets that are corresponding to the scene-modes. In one embodiment of the invention, the weighted parameters of different sets are all pre-stored in the client device, whenever the scene-mode changes, a different set of weighted parameters corresponding to the scene-mode will be applied to the AI enhance module for generating the enhanced images. In another embodiment, the weighted parameters are all stored in the server, whenever the scene-mode changes, a different set of weighted parameters corresponding to that scene-mode will be downloaded from the server to the client device, and then applied to the AI enhance module for generating the enhanced images.

Figure 4:
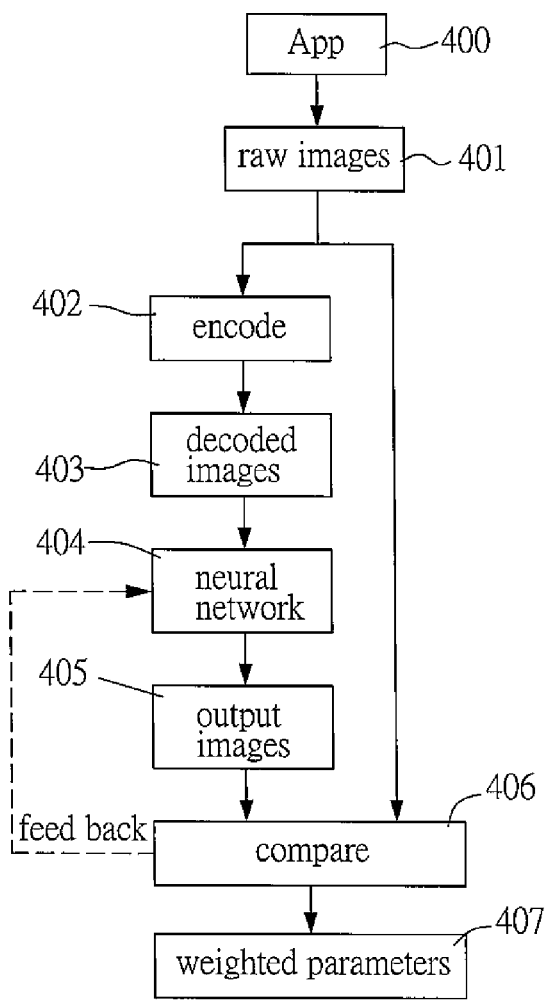
FIG. 4 is a schematic diagram showing the first embodiment of the training process of artificial neural network module 105 in accordance with the present invention.

FIG. 4 is a schematic diagram showing the first embodiment of the training process of artificial neural network module 105 in accordance with the present invention. In the present invention, the algorithms of AI enhance module 204 of the client device 2 is trained and defined by a training process of the artificial neural network module 105 performed by the server 1. The training process comprises the following steps:

STEP 400: executing the first application in a training mode to generate a plurality of training raw images (STEP 401);

STEP 402: encoding the training raw images into a plurality of training encoded images by using the encoder;

STEP 403: decoding the training encoded images into a plurality of training decoded images by using the training decoder of the server;

STEP 404: the artificial neural network module accepting the training decoded images and processing the training decoded images one by one by using at least one training algorithm in order to generate a plurality of training output images (STEP 405); the at least one training algorithm having a plurality of training weighted parameters; and STEP 406: using the compare and train module to compare the differences between the training output images and their corresponding training raw images one by one, so as to modify the training weighted parameters of the at least one training algorithm according to the differences between each training output image and its corresponding training raw image; the training weighted parameters being modified to minimize the differences between the training output images and their corresponding training raw images; each time when the training weighted parameters being modified, the modified training weighted parameters being fed back to the at least one training algorithm for processing another training decoded image in STEP 404. After a predetermined amount of the training output images and their corresponding training raw images are compared, and a predetermined times of the training weighted parameters are modified, the training weighted parameters (STEP 407) are applied to the at least one algorithm of the AI enhance module of the client device.

In the first embodiment of the invention, the training decoded image is input to the artificial neural network module in order to generate the training output image. The training output image and the training raw image are then compared in order to calculate the amount of error. And then, using a mathematical optimization algorithm such like Adam, SGD (Stochastic gradient descent), or RMSProp (Root Mean Square Propagation) to learn the weighted parameters (usually referred as weight w, bias b) of the artificial neural network, making the error as small as possible, such that the training output image will be closer to its corresponding training raw image. Different methods can be used to calculate the error (or similarity) to suit different requirements, for example, MSE (mean square error), L1 regularization (absolute value error), PSNR (peak signal-to-noise ratio), SSIM (structure similarity), GAN loss (generative adversarial networks loss), LPIPS (Learned Perceptual Image Patch Similarity) metrics and etc. In the first embodiment, the following methods are employed to calculate the error: (1) weighted average of MSE, L1 and GAN loss; (2) MSE; (3) GAN loss and also training Discriminator in the same time; (4) weighted average of MSE and Edge of MSE; (5) weighted average of SSIM and MSE. More detailed descriptions of the training process will be illustrated later.

Figure 5:
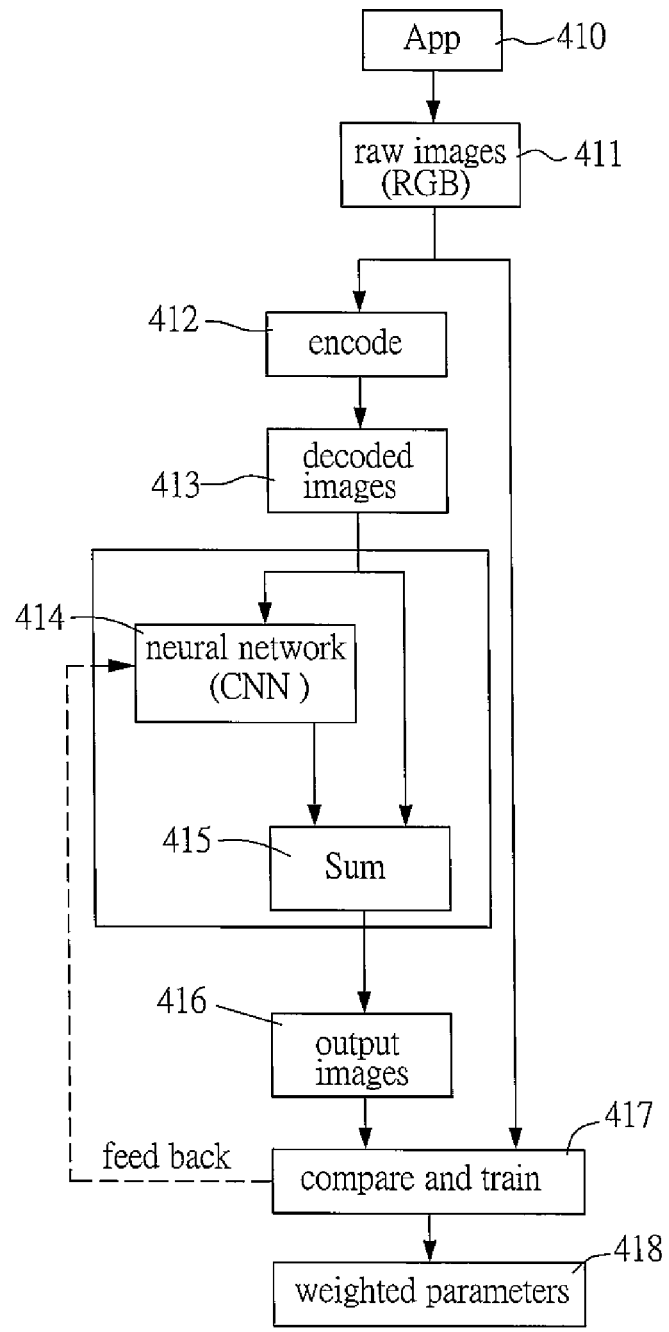
FIG. 5 is a schematic diagram showing the second embodiment of the training process of artificial neural network module 105 in accordance with the present invention.

FIG. 5 is a schematic diagram showing the second embodiment of the training process of artificial neural network module 105 in accordance with the present invention. The training process of the second embodiment comprises the following steps:

STEP 410: executing the first application in a training mode to generate a plurality of training raw images (STEP 411), wherein the color format of these training raw images is RGB;

STEP 412: encoding the training raw images into a plurality of training encoded images by using the encoder;

STEP 413: decoding the training encoded images into a plurality of training decoded images by using the training decoder of the server;

STEP 414: in the second embodiment, when the color formats of the training decoded images and the training output images are the same (both RGB in this embodiment), residual network module (Convolutional Neural Network, CNN) is used in the artificial neural network module; the output of the residual network module for processing the corresponding training decoded image being summed up (STEP 415) with a corresponding training decoded image; and then, the sum of the output of the residual network module and the training decoded image is output as the training out image (STEP 416); and STEP 417: using the compare and train module to compare the differences (calculate the error) between the training output images and their corresponding training raw images one by one, so as to modify the training weighted parameters of the at least one training algorithm according to the differences between each training output image and its corresponding training raw image; the training weighted parameters being modified to minimize the differences between the training output images and their corresponding training raw images; each time when the training weighted parameters being modified, the modified training weighted parameters being fed back to the artificial neural network for processing another training decoded image in STEP 414. After a predetermined amount of the training output images and their corresponding training raw images are compared, and a predetermined times of the training weighted parameters are modified, the training weighted parameters (STEP 418) are applied to the at least one algorithm of the AI enhance module of the client device.

Figure 6:
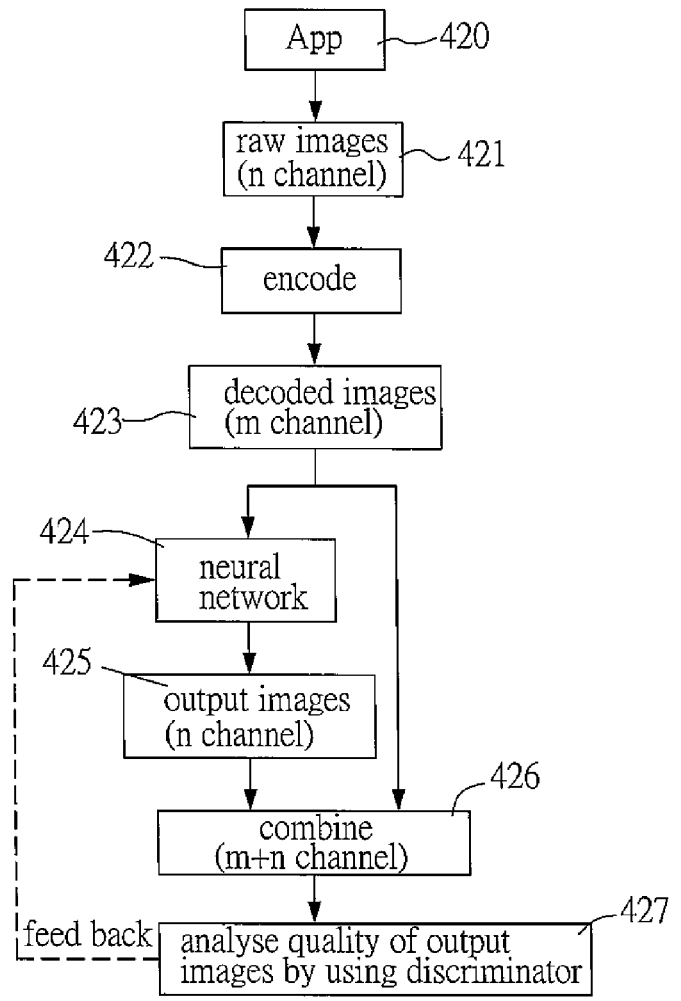
FIG. 6 is a schematic diagram showing the third embodiment of the training process of artificial neural network module 105 in accordance with the present invention.

FIG. 6 is a schematic diagram showing the third embodiment of the training process of artificial neural network module 105 in accordance with the present invention. In this third embodiment, the compare module employs a discriminator to compare the differences between the training output image and its corresponding training raw image for converging Generative Adversarial Networks (GAN) loss and modifying the training weighted parameters. The training process of the third embodiment comprises the following steps:

STEP 420: executing the first application in a training mode to generate a plurality of training raw images (STEP 421), wherein the training raw images comprise n channels, where n is a positive integer (ps. In this embodiment, n is preferably an integer greater than two);

STEP 422: encoding the training raw images into a plurality of training encoded images by using the encoder;

STEP 423: decoding the training encoded images into a plurality of training decoded images by using the training decoder of the server; wherein the training decoded images comprise m channels, where m is a positive integer (ps. In this embodiment, m is preferably an integer greater than two); and STEP 424: the artificial neural network module accepting the training decoded images and processing the training decoded images one by one by using at least one training algorithm in order to generate a plurality of training output images (STEP 425); the at least one training algorithm having a plurality of training weighted parameters; wherein the training output images comprise n channels; the training output images (n channels) and their corresponding training decoded images (m channels) are combined (STEP 426) to generate a plurality of training combined images (with m+n channels), and then, the training combined images are fed to a Discriminator (STEP 427) for analyzing the quality of the training output images, in order to train the artificial neural network.

Figure 7:
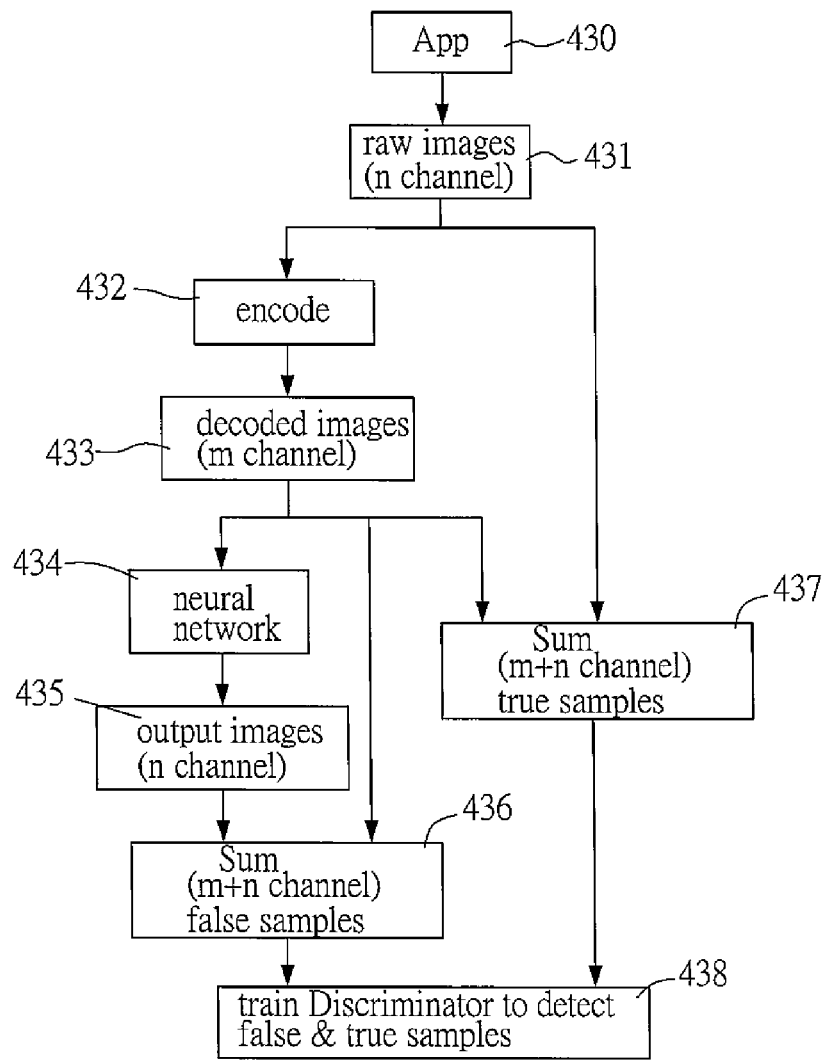
FIG. 7 is a schematic diagram showing an embodiment of the training process of Discriminator shown in FIG. 6.

FIG. 7 is a schematic diagram showing an embodiment of the training process of Discriminator shown in FIG. 6. The training process of Discriminator comprises the following steps:

STEP 430: executing the first application in a training mode to generate a plurality of training raw images (STEP 431), wherein the training raw images comprise n channels, where n is a positive integer (ps. In this embodiment, n is preferably an integer greater than two);

STEP 432: encoding the training raw images into a plurality of training encoded images by using the encoder;

STEP 433: decoding the training encoded images into a plurality of training decoded images by using the training decoder of the server; wherein the training decoded images comprise m channels, where m is a positive integer (ps. In this embodiment, m is preferably an integer greater than two);

STEP 434: the artificial neural network module accepting the training decoded images and processing the training decoded images (m channels) one by one by using at least one training algorithm in order to generate a plurality of training output images (STEP 435); the at least one training algorithm having a plurality of training weighted parameters; wherein the training output images comprise n channels;

STEP 436, the n channels of training output images are summed with the m channels of training decoded images to generate m+n channels of simulated false samples; in addition, the n channels of training raw images are summed with the m channels of training decoded images to generate m+n channels of simulated true samples (STEP 437); and STEP 438, the m+n channels of simulated false samples and the m+n channels of simulated true samples are fed to the Discriminator of the compare module for training an ability of the Discriminator to detect and recognize the simulated false samples and simulated true samples.

After the artificial neural network 105 (see FIG. 2) is well trained in the server 1 side, the weighted parameters (weight w, bias b) are applied to the AI enhance module 204. The AI enhance module 204 and its associated weighted parameters (weight w, bias b) are downloaded to and saved in the client device 2. After then, whenever the client device accepts and decodes the encoded images of the 2D video streams, each decoded image will be processed by the AI enhance module in order to generate enhanced images. The client device then displays the enhanced images on its screen as the output images. The is neural network can learn and enhance the color, brightness, and details of the images. Because of the encoding process and the format of streaming, some details of the raw images will be damaged or lost. A well-trained neural network can fix these damaged or lost details. In the embodiment of the invention, the neural network of the AI enhance module requires the following information to operate:

Related Functions and Parameters:

X: input image.

Conv2d(X, a, b, c, d, w, b): performed on X; amount of output channel=a; kernel_size=b; stride=c; padding size=2d convolution with bias of d; the weighted parameters of training are kernel w and bias b.

Conv2dTranspose(X, a, b, c, w, b)): performed on X; amount of output channel=a; kernel_size=b; stride=c; cropping size=2d transpose convolution with bias of d; the weighted parameters of training are kernel w and bias b.

$\sigma(X)$: nonlinear activation function working on X.

uint8(x): to control and limit the value of floating point x between 0 and 255 (255 included), use round down method, transform to unsigned int8.

R(X, w): residual blocks working on X, which includes a lot of conv2d and batchnorm, each has its own weighted parameters to be trained (more information can be referred by the following web-site as reference: https://stats.stackexchange.com/questions/246928/what-exactly-is-a-residual-learning-block-in-the-context-of-deep-residual-networ).

Since the input and output images might have different color coding format such like RGB, YUV420, YUV444, more discussions regarding to different color coding formats of the input and output images are discussed hereunder.

First Case: raw image is RGB, and output image is RGB

This case is the simplest one because both the input and output images are RGB images. In order to increase the processing speed, a relative large kernel size (such as 8×8, stride 4 for convolution and transpose convolution structures) is used to accelerate the calculations as fast as possible in order to handle the high resolution of Full HD of the images. Residual network is used in this case to make the convergence easier and more steady.

Related functions and parameters:

X: input image, which is RGB format, and each color is unsigned int8 format;

$$X_2 = \frac{X - 127.5}{128};$$

$Y = u\text{int8}((\text{Conv2dTranspose}(\sigma(\text{Conv2d}(X2,a,b,c,d,w\_1,b\_1)),w\_2,b\_2)+X2)*128+128);$ w_1 is a matrix having a size of b*b*3*a; b_1 is a vector whose size is a;

w_2 is a matrix having a size of b*b*3*a; b_2 is a vector whose size is 3;

parameters used are:

the resolution of X is 1280×720;

a=128, b=10, c=5, d=0, $\sigma$=leaky relu with alpha=0.2;
a=128, b=9, c=5, d=4, $\sigma$=leaky relu with alpha=0.2;
a=128, b=8, c=4, d=0, $\sigma$=leaky relu with alpha=0.2;

if the client device has faster processing speed, then the following equation can be used:

$Y = u\text{int8}((\text{Conv2dTranspose}(R(\sigma(\text{Conv2d}(X2,a,b,c,d,w\_1,b\_1)),w\_R),w\_2,b\_2)+X2)*128+128);$ w_1 is a matrix having a size of b*b*3*a; b_1 is a vector whose size is a;

w_2 is a matrix having a size of b*b*3*a; b_2 is a vector whose size is 3;

wherein R is residual blocks having n layers;

wherein a lot of network layers are included, each has its own weighted parameters to be trained, which are collectively called as w_R;

parameters used are:

a=128, b=8, c=4, d=0, $\sigma$=leaky relu with alpha=0.2; n=2;
a=128, b=8, c=4, d=0, $\sigma$=leaky relu with alpha=0.2; n=6.

Second Case: raw image is YUV420, and output image is either RGB or YUV444

If the input image is YUV420, and the output image is RGB or YUV444, then, because the resolution and format of the input and out images are different, Residual network cannot be applied directly in this case. The method of the present invention decodes the YUV420 input image first, and then uses the neural network (called as network A, N=3) to process the decoded image to obtain an image with RGB or YUV444 format (called as X2). Then the image X2 is fed to the aforementioned neural network (Residual network) for training. In addition, same training method is also applied on the network A by comparing the errors between X2 and raw image, in order to train the network A.

X_y is the Y of the input image with YUV420 format, in the form of unsigned int8;

X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$X2 = \text{Conv2d}(X2\_y,3,e,1,w\_y,b\_y) + \text{Conv2dTranspose}(X2\_uv,3,f,2,w\_uv,b\_uv);$ w_y is a matrix having a size of e*e*1*3; b_y is a vector whose size is 3;

w_uv is a matrix having a size of f*f*3*2; b_uv is a vector whose size is 3;

The above illustration is the first embodiment of the neural network A.

At last, the equation for output the output image is the same as the embodiment when the input and output images are both RGB format.

$$Y=u\text{int8}((\text{Conv2dTranspose}(a(\text{Conv2d}(X2,a,b,c,d, w\_1,b\_1)),w2,b\_2)+X2)*128+128);$$

w_1 is a matrix having a size of b*b*3*a; b_1 is a vector whose size is a;

w_2 is a matrix having a size of b*b*3*a; b_2 is a vector whose size is 3;

parameters used are also the same as the embodiment when the input and output images are both RGB:

the resolution of X is 1280×720;

a=128, b=8, c=4, d=0, e=1, f=2, σ=leaky relu with alpha=0.2;

a=128, b=8, c=4, d=0, e=1, f=2, σ=leaky relu with alpha=0.2.

Figure 8:
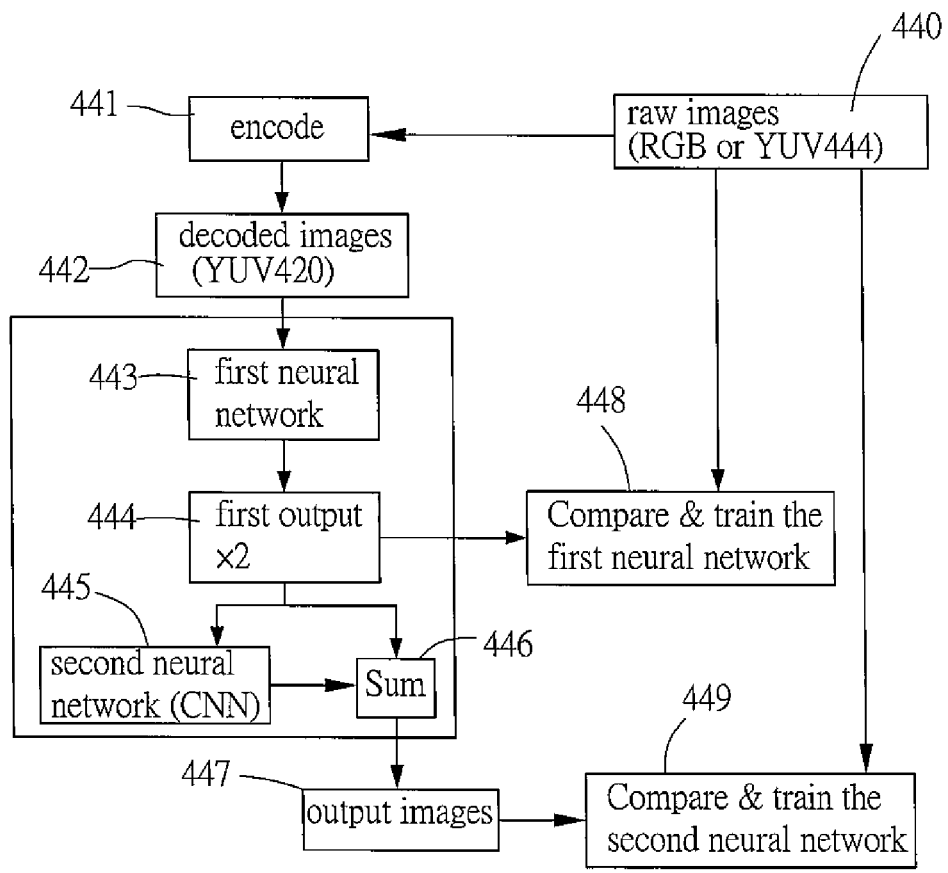
FIG. 8 is a schematic diagram showing an embodiment of the training process of neural network when the raw image is YUV420, and the output image is either RGB or YUV420.

Please refer to FIG. 8 which is a schematic diagram showing an embodiment of the training process of neural network when the raw image is YUV420, and the output image is either RGB or YUV420. The training process of neural network comprises the following steps:

STEP 440: executing the first application in a training mode to generate a plurality of training raw images, wherein the training raw images are either RGB or YUV444 format;

STEP 441: encoding the training raw images into a plurality of training encoded images by using the encoder;

STEP 442: decoding the training encoded images into a plurality of training decoded images by using the training decoder of the server; wherein the training decoded images are YUV420 format;

STEP 443: the artificial neural network module includes a first neural network and a second neural network; the first neural network (also called as neural network A) accepting the training decoded images and processing the training decoded images (YUV420) one by one by using at least one training algorithm in order to generate a plurality of first output X2 images (also called as X2, see STEP 444) that have the same coding format with the training raw images; the at least one training algorithm having a plurality of training weighted parameters;

STEP 445, the second neural network is a Convolutional Neural Network (CNN); the second neural network (also called as CNN neural network) accepts the first output X2 images and processes the first output X2 images one by one by using at least one training algorithm in order to generate a plurality of second output images; the at least one training algorithm having a plurality of training weighted parameters; the first output X2 images and the second output images are then summed (STEP 446) to form the training output images (STEP 447);

the compare module includes a first comparator and a second comparator; in STEP 448, the first comparator compares the differences between the first output X2 images and their corresponding training raw images in order to train the first neural network; in STEP 449, the second comparator compares the differences between the training output images and their corresponding training raw images in order to train the second neural network.

Figure 9:
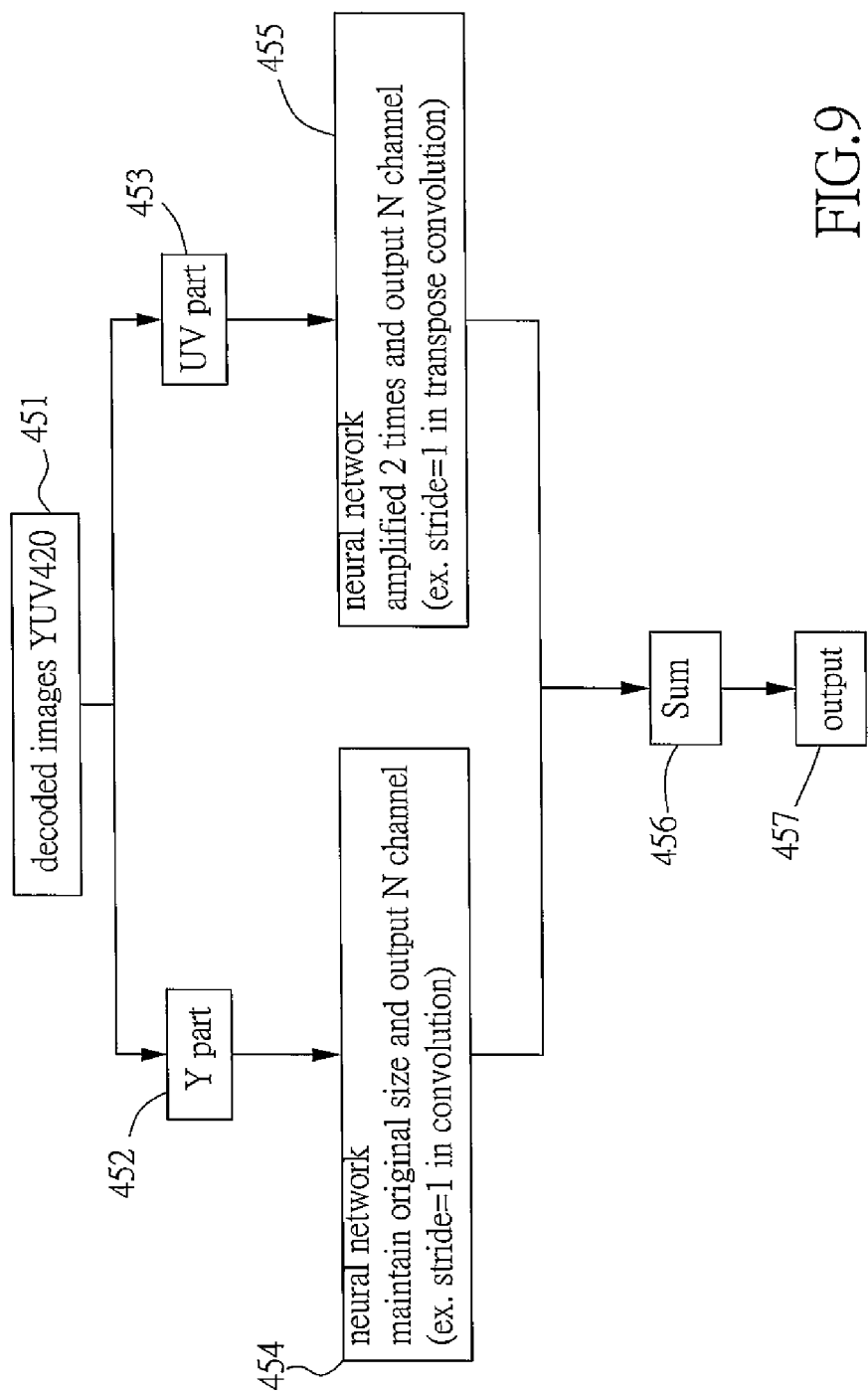
FIG. 9 is a schematic diagram showing an embodiment of process to handle the decoded images with YUV420 format in accordance with the invention.

FIG. 9 is a schematic diagram showing an embodiment of process to handle the decoded images with YUV420 format in accordance with the invention. The process to handle the decoded images with YUV420 format comprises:

STEP 451, the first neural network accepts and processes the training decoded images of YUV420 color coding format by using the following:

STEP 452, extracts Y-part data of the training decoded images, and the neural network with standard size processes the Y-part data of the training decoded images in order to generate Y-part output data with N channels (ex. Stride=1 in convolution; see STEP 454);

STEP 453, extracts UV-part data of the training decoded images, and uses two-times amplified first neural network to process the UV-part data of the training decoded images in order to generate UV-part output data with N channels (ex. Stride=1 in convolution; see STEP 455);

STEP 456, sums the Y-part output data and the UV-part output data in order to generate the training output images (STEP 457).

Third Case: raw image is YUV420, and output image is either YUV444 (another method which is faster)

If the input image is YUV420, and the output image is YUV444, then, in addition to the method previously described, there is another method to perform the first neural network (neural network A), which is a special case with faster speed. The decoded image with YUV420 format is firstly transformed to an image of YUV444 (also called as X2) by using the first neural network (neural network A); and then, the X2 is fed to the aforementioned neural network (Residual network) for training. In addition, same training method is also applied on the network A by comparing the errors between X2 and raw image, in order to train the network A.

X_y is the Y of the input image with YUV420 format, in the form of unsigned int8;

X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$$X3uv=\text{Conv2dTranspose}(X2uv,2,2,2,w\_uv,b\_uv)$$

w_uv is a matrix having a size of 2*2*2*2; b_uv is a vector whose size is 2;

$$X2=\text{concat}(X2\_y,X3\_uv);$$

the above descriptions refer to another embodiment of the neural network A, the function "concat" is to connect the input following the direction of channels.

At last, the equation for output the output image is the same as the embodiment when the input and output images are both RGB format.

$$Y=u\text{int8}((\text{Conv2dTranspose}(\sigma(\text{Conv2d}(X2,a,b,c,d, w\_1,b\_1)),w\_2,b2)+X2)*128+128);$$

w_1 is a matrix having a size of b*b*3*a; b_1 is a vector whose size is a;
w_2 is a matrix having a size of b*b*3*a; b_2 is a vector whose size is 3;
parameters used are also the same as the embodiment when the input and output images are both RGB:
the resolution of X is 1280×720;
a=128, b=10, c=5, d=0, σ=leaky relu with alpha=0.2;
a=128, b=9, c=5, d=4, σ=leaky relu with alpha=0.2;
a=128, b=8, c=4, d=0, σ=leaky relu with alpha=0.2.

Figure 10:
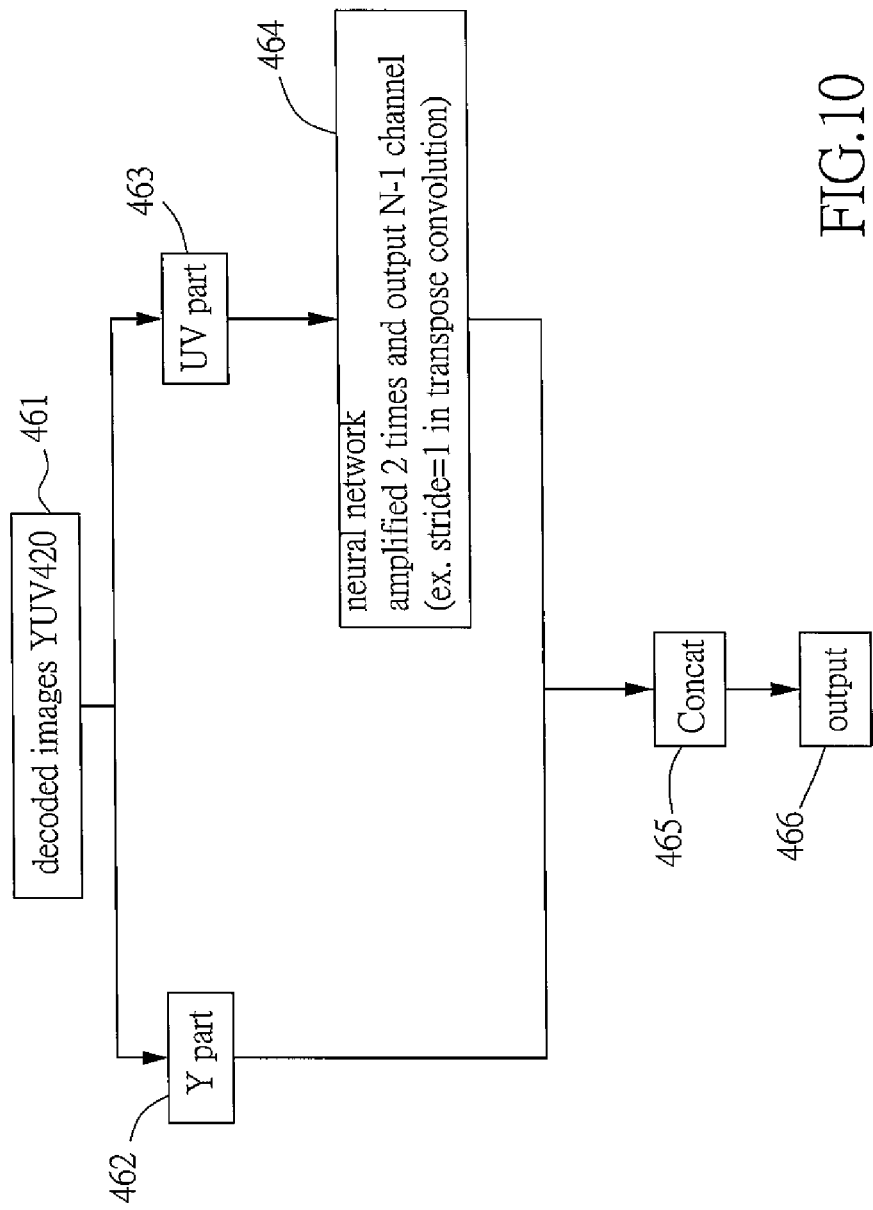
FIG. 10 is a schematic diagram showing another embodiment of process to handle the decoded images with YUV420 format in accordance with the invention.

FIG. 10 is a schematic diagram showing another embodiment of process to handle the decoded images with YUV420 format in accordance with the invention. The process to handle the decoded images with YUV420 format comprises:

STEP 461, the first neural network accepts and processes the training decoded images of YUV420 color coding format by using the following steps, wherein, the training decoded images comprise N channels, wherein N is a positive integer (ps. In this embodiment, N is preferably an integer greater than 2);

STEP 462, extracts Y-part data of the training decoded images in order to generate Y-part output data;

STEP 463, extracts UV-part data of the training decoded images, and uses two-times amplified first neural network to process the UV-part data of the training decoded images in order to generate UV-part output data with N-1 channels (ex. Stride=1 in transpose convolution; see STEP 464);

STEP 465, Concat (concatenates) the Y-part output data and the UV-part output data in order to generate the training output images (STEP 466).

Fourth Case: raw image is YUV420, and output image is also YUV420

If the input image is YUV420, and the output image is also YUV420, then the process is similar to RGB-to-RGB. However, because the input format and the out format are different, different methods of convolutions are applied for different channels. For example, when the neural network of kernel size 8×8, stride 4 is used in Y-part of image, then the neural network will change to kernel size 4×4, stride 2 for handling the UV-part of image.

X_y is the Y of the input image with YUV420 format, in the form of unsigned int8;
X_uv is the Y of the input image with YUV420 format, in the form of unsigned int8;

$$X_{2,y} = \frac{X_y - 127.5}{128};$$

$$X_{2,uv} = \frac{X_{uv} - 127.5}{128};$$

$X3=\sigma(\text{Conv2d}(X2\_y,a,b,c,w\_y,b\_y)+\text{Conv2d}(X2\_uv,a,b/2,c/2,w\_uv,b\_uv))$ w_y is a matrix having a size of b*b*1*a; b_y is a vector whose size is a;
w_uv is a matrix having a size of (b/2)*(b/2)*2*a; b_uv is a vector whose size is a;

$X4\_y=\text{Conv2dTranspose}(X3,1,b,c,w\_1,b\_1)+X2\_y$ $X4uv=\text{Conv2dTranspose}(X3,2,b/2,c/2,w\_2,b\_2)+X2uv;$ w_1 is a matrix having a size of b*b*1*a; b_1 is a vector whose size is 1;
w_2 is a matrix having a size of (b/2)*(b/2)*2*a; b_2 is a vector whose size is 2;

Final Output:

$Y\_y=u\text{int8}(X4\_y*128+128)$ $Y\_uv=u\text{int8}(X4\_uv*128+128)$

Parameters Used:
a=128, b=8, c=4, d=0, e=1, f=2, σ=leaky relu with alpha=0.2;
a=128, b=8, c=4, d=0, e=2, f=2, σ=leaky relu with alpha=0.2.

The detailed descriptions of the parameters used in the invention are illustrated below:

Training Parameters:
the initial values of the weighted parameters are arranged regarding to Gaussian distribution, mean=0, std-dev=0.02;
training process uses Adam algorithm, learning rate=1e-4, beta1=0.9;
mini batch size=1;
the primary error function is:

$100*(L2+L2e)+\lambda*L1+\gamma*D+\alpha*Lg;$ the parameters used in standard are:
λ=0, γ=0, α=0
λ=0, γ=0, α=100
λ=0, γ=1, α=0
λ=10, γ=0, α=0
λ=10, γ=0, α=100
λ=10, γ=1, α=0 wherein:
L2=mean((T−Y)²); wherein mean is average, T is the training object;
L1=mean(|T−Y|); wherein mean is average, T is the training object;
D is the GAN loss, using ordinary GAN training methods to train the Discriminator in order to distinguish (X,Y) and (X,T).

The equation of Lg is:
for an image of W×H, $Y\_dx(i,j)=Y(i+1,j)-Y(i,j)\ 0<=i<W-1,\ 0<=j<H$ $T\_dx(i,j)=T(i+1,j)-T(i,j)\ 0<=i<W-1,\ 0<=j<H$ $Y\_dy(i,j)=Y(i,j+1)-Y(i,j)\ 0<=i<W,\ 0<=j<H-1$ $T\_dy(i,j)=T(i,j+1)-T(i,j)\ 0<=i<W,\ 0<=j<H-1$ $L_g=\text{mean}((T_{dx}-Y_{dx})^2)+\text{mean}((T_{dy}-Y_{dy})^2)$ Under the RGB mode, the training object T is the original raw images of RGB gaming images.

Under the YUV444 mode, the training object T is the original raw images of RGB gaming images.

Under the modes of RGB→RGB and YUV420→YUV420, L2e=0.

Under the modes of YUV420→RGB and YUV420→YUV444, $L_{2e}=\text{mean}((T-X_2)^2)$ It can be understood from the above descriptions that, the method for enhancing quality of media transmitted via network of the invention has the following advantages:
can keep training the neural network anytime according to various images having different contents, so as to perform different enhancing effects on different image contents; for example, for images with cartoon style, reality style, or different scenes and so on, different weighted parameters w, b can be either pre-stored in or dynamically downloaded to the client device;

regarding to the way to determine which mode should the raw images belong to, the neural network in the server side can automatically determine the mode of raw images, and transmit such information to the client device; because the contents of raw images have their consistency, such determining process can be performed periodically by the server, says once per second; however, in another embodiment, the process to determine the mode of images can also be performed periodically by the client device, says once per several seconds, according to the calculating ability of client device;

training is performed according to real video images, the increased level of enhancement can be actually measured; for example, when using the method of the invention to enhance the video images with resolution 1280×720 and bitrate 3000, the PSNR value of similar scene can increase around 1.5~2.2 db, it is proved that the method of the invention can truly improve the quality of output images and also make the output images to be visually more similar to the quality of original raw images; and is unlike those well-known image enhancing technologies which can merely increase the contrast, smoothing and color filtering of the output images;

by using simplified model of algorithms of neural network, and using large kernel, large stride value, the resolution of neural network is decreased rapidly, and the processing speed of the model can be vastly increased, even a client device with limited calculating ability can achieve the goal of output images with 60 fps and HD resolution;

by implementing transformation of color format (YUV420 and RGB) into the neural network, and taking the advantages that the UV channel has lower resolution than the Y channel, the stride value of UV channel is set to be a half of the Y channel, in order to increase the calculating speed of neural network.

In addition to the embodiments described above, the method for enhancing quality of media transmitted via network of the invention still has various different extended applications; such like: increasing the resolution of display, enlarging the size of screen, increasing the updating rate of screen (i.e., increasing the rate of frames-per-second (FPS)), multi-frame input, screen prediction, off-line application, and etc., which will be illustrated below.

Figure 11:
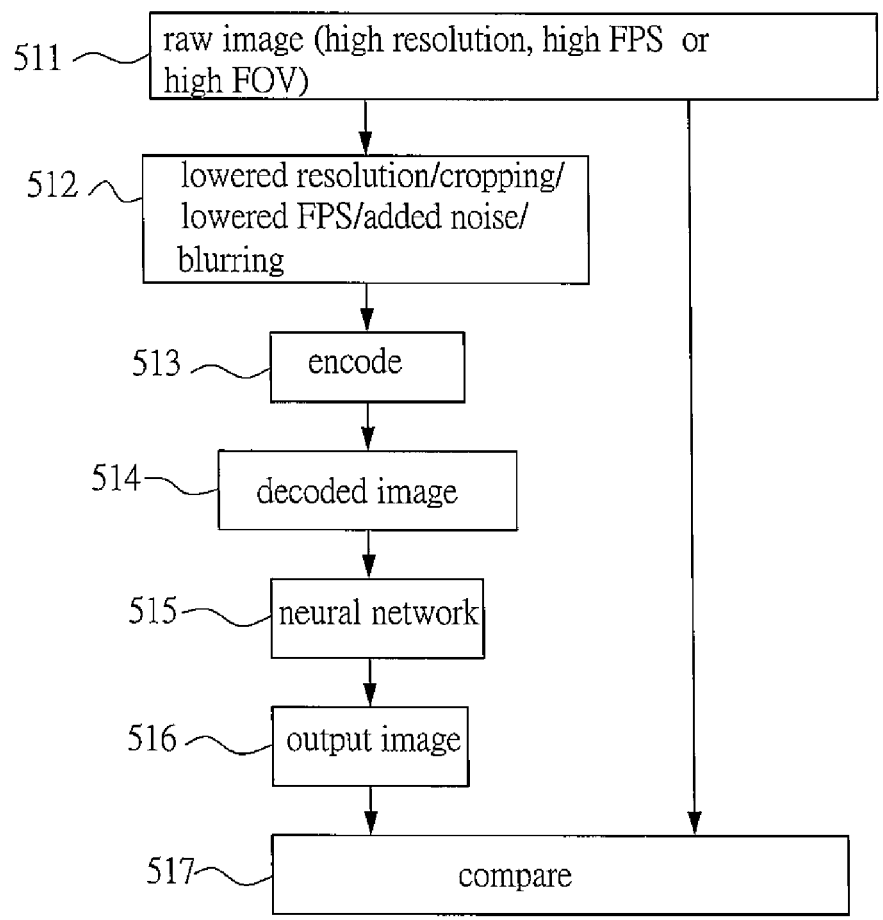
FIG. 11 is a schematic diagram showing yet another embodiment (the fourth embodiment) of the training process of artificial neural network module in accordance with the present invention.

Please refer to FIG. 11, which is a schematic diagram showing yet another embodiment (the fourth embodiment) of the training process of artificial neural network module in accordance with the present invention. In the present invention, the mathematical expressions used by the AI enhance module 204 of the client device 2 are trained and defined by a training process executed by the artificial neural network module 105 in the server 1. The embodiment of the training process as shown in FIG. 11 comprises the following steps:

Step 511: providing a training video in a training mode. The training video is composed of a plurality of training raw images of high quality. These training raw images of high quality can be obtained from either a real-time video stream generated by a gaming program or other software, or a pre-recorded or pre-stored video saved in a memory (for example, but not limited to: MP4, 3GP, AVI, MKV, WMV, MPG, VOB, FLV, SWF, MOV, RMVB or other formats of video). In this embodiment, these training raw images have relatively higher or the best image quality, for example, the training raw images meet at least one or more of the following image properties: (a) higher resolution such as 4K or 8K resolution; (b) larger field of view (FOV) such as 150 degrees, 180 degrees or even 360 degrees; (c) higher frame-per-second (FPS) such as 60 FPS or 120 FPS; (d) with stereo vision; (e) with visual depth information; (f) with additional color information such as infrared, ultraviolet, or other (please refer to this web-page for further information: https://photo.stackexchange.com/questions/83923/why-dont-cameras-off er-more-than-3-colour-channels-or-do-they); and/or (g) with better audio such as multi-channel, high sampling frequency (44 khz or higher) or high resolution (audio bit depth 24 bit or above), etc.

Step 512: degradation of training raw images. Degrading the training raw images with a degradation module to reduce their image quality, in order to obtain the degraded training raw images that meet one or more of the following properties, for example, but not limited to: lowered resolution (down to 720p, 1080i or lower) by sampling method; (b) smaller FOV by cropping method (down to 120 degree or lower, or cropping the original aspect ratio of 16:9 down to 4:3); (c) reduced frame updating rate by discarding method (down to 30 FPS or lower); (d) single image retrieved from stereo vision; (e) discarded visual depth information; (f) discarded additional color information; (g) converted audio to stereo dual channel, reduced sampling frequency (22.1 khz or lower), reduced resolution (16 bit or lower); (h) added noise (Gaussian or Laplacian noises); (i) blurred (Gaussian blur), etc.

Step 513: encoding the degraded training raw images into a plurality of training encoded images by using the encoder.

Step 514: decoding the training encoded images into a plurality of training decoded images by using the training decoder of the server.

Step 515: the artificial neural network module of the server accepting the training decoded images and processing the training decoded images one by one by using at least one training algorithm in order to generate a plurality of training output images (Step 516); the at least one training algorithm having a plurality of training weighted parameters.

Step 517: using the compare and train module to compare the differences between the training output images and their corresponding training raw images provided in Step 511 one by one, so as to modify the training weighted parameters of the at least one training algorithm according to the differences between each training output image and its corresponding training raw image. The training weighted parameters are modified to minimize the differences between the training output images and their corresponding training raw images. Each time when the training weighted parameters are modified, the modified training weighted parameters are fed back to the at least one training algorithm for processing another training decoded image in Step 515. After a predetermined amount of the training output images and their corresponding training raw images are compared, and a predetermined times of the training weighted parameters are modified, the modified training weighted parameters are applied to the at least one algorithm of the AI enhance module of the client device.

In the embodiment shown in FIG. 11, the training decoded image is input to the artificial neural network module in order to generate the training output image. The training output image and the training raw image are then compared in order to calculate the amount of error. And then, using a mathematical optimization algorithm such like Adam, SGD (Stochastic gradient descent), or RMSProp (Root Mean Square Propagation) to learn the weighted parameters (usually referred as weight w, bias b) of the artificial neural network, making the error as small as possible, such that the training output image will be closer to its corresponding training raw image of high quality. Different methods can be used to calculate the error (or similarity) to suit different requirements, for example, MSE (mean square error), L1 regularization (absolute value error), PSNR (peak signal-to-noise ratio), SSIM (structure similarity), GAN loss (generative adversarial networks loss), LPIPS (Learned Perceptual Image Patch Similarity) metrics and etc. In this embodiment, the following methods are employed to calculate the error: (1) weighted average of MSE, L1 and GAN loss; (2) MSE; (3) GAN loss and also training Discriminator in the same time; (4) weighted average of MSE and Edge of MSE; (5) weighted average of SSIM and MSE.

Figure 12:
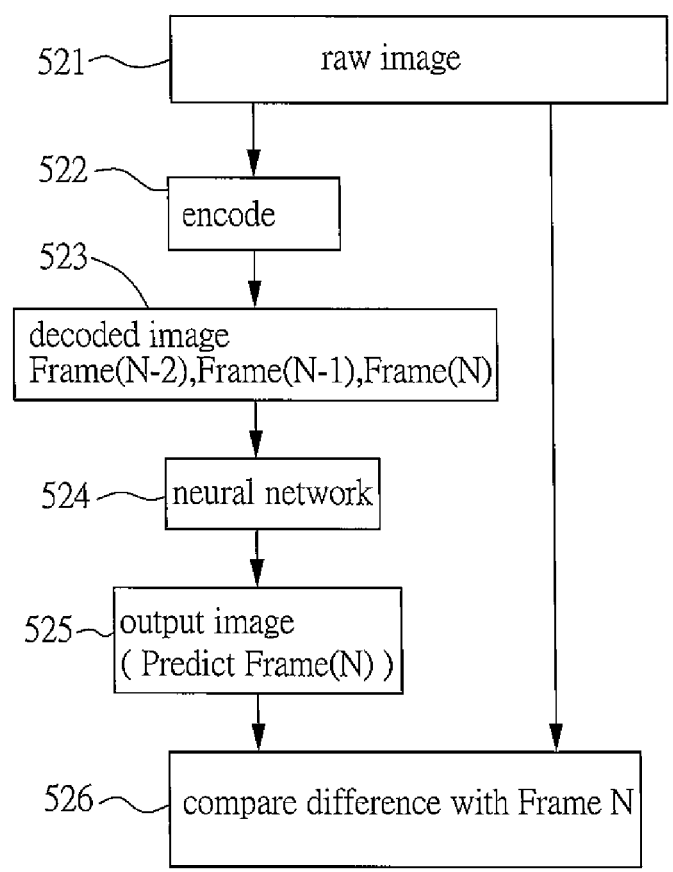
FIG. 12 is a schematic diagram showing a further embodiment (the fifth embodiment) of the training process of artificial neural network module in accordance with the present invention.

Please refer to FIG. 12, which is a schematic diagram showing a further embodiment (the fifth embodiment) of the training process of artificial neural network module in accordance with the present invention. In the training process of this embodiment, the input of the artificial neural network may contain several images at one time. Using the information of the previous images to help enhance the current image, so as to obtain a more optimized enhancing effect which is even closer to the original raw image. The embodiment of the training process as shown in FIG. 12 comprises the following steps Step 521: providing a training video in a training mode. The training video is composed of a plurality of training raw images which can be obtained from either a real-time video stream generated by a gaming program or other software, or a pre-recorded or pre-stored video saved in a memory. In this embodiment, the frames of the plurality of training raw images are represented by Frame(1), Frame(2), . . . , Frame (N−1), Frame(N); in which N is a positive integer.

Step 522: encoding these training raw images into a video streaming composed of the plurality of training encoded images by using the encoder; wherein the frames thereof are represented by Encoded_Frame(1), Encoded_Frame(2), . . . , Encoded_Frame(N−1), Encoded_Frame(N); in which N is a positive integer.

Step 523: decoding the training encoded images into a plurality of training decoded images by using the training decoder of the server; wherein the frames thereof are represented by Decoded_Frame(1), Decoded_Frame(2), . . . , Decoded_Frame(N−1), Decoded_Frame(N); in which N is a positive integer. And then, retrieving the frame of the Nth training decoded image and the previous frame or frames corresponding to the Nth training raw image Frame (N), such like Decoded_Frame(N−2), Decoded_Frame(N−1), Decoded_Frame(N) to proceed with the next Step 524. Wherein, when the value of N−2 or N−1 is less than 1, the Decoded_Frame (1) frame is used to replace the frames Decoded_Frame (N−2) and Decoded_Frame (N−1).

Step 524: the artificial neural network module of the server accepting the training decoded images and processing the Nth frame of training decoded image and its previous one or more frames such as Decoded_Frame(N−2), Decoded_Frame(N−1), Decoded_Frame(N) according to the corresponding training raw image (Frame(N), where N=3, 4, 5, . . . ) one by one by using at least one training algorithm in order to generate a frame of training output image (also referred as Predict_Frame(N), see Step 525). The at least one training algorithm includes a plurality of training weighted parameters. In other words, the artificial neural network module can receive several (eg., three) sequential frames Decoded_Frame (N−2), Decoded_Frame (N−1), Decoded_Frame (N) of training decoded images each time and output a frame Predict_Frame (N) of training output image as shown in Step 525.

Step 526: using the compare and train module to compare the differences between the frames Predict_Frame (N) of training output images and their corresponding frames Frame(N) of training raw images one by one, so as to modify the training weighted parameters of the at least one training algorithm according to the differences between each frame of training output image and its corresponding frame of training raw image. The training weighted parameters are modified to minimize the differences between the frames Predict_Frame (N) of training output images and their corresponding frames Frame(N) of training raw images. And then, using a mathematical optimization algorithm (such like Adam/SGD/RMSProp) to learn the weighted parameters of the artificial neural network, making the error as small as possible. Each time when the training weighted parameters are modified, the modified training weighted parameters are fed back to the at least one training algorithm for processing another training decoded image in Step 524. After a predetermined amount of the training output images and their corresponding training raw images are compared, and a predetermined times of the training weighted parameters are modified, the modified training weighted parameters are applied to the at least one algorithm of the AI enhance module of the client device. Different methods can be used to calculate the error (or similarity) to suit different requirements, for example, MSE, L1 regularization, PSNR, SSIM, GAN loss, LPIPS, and etc. In this embodiment, the following methods are employed to calculate the error: (1) weighted average of MSE, L1 and GAN loss; (2) MSE; (3) GAN loss and also training Discriminator in the same time; (4) weighted average of MSE and Edge of MSE; (5) weighted average of SSIM and MSE.

Figure 13:
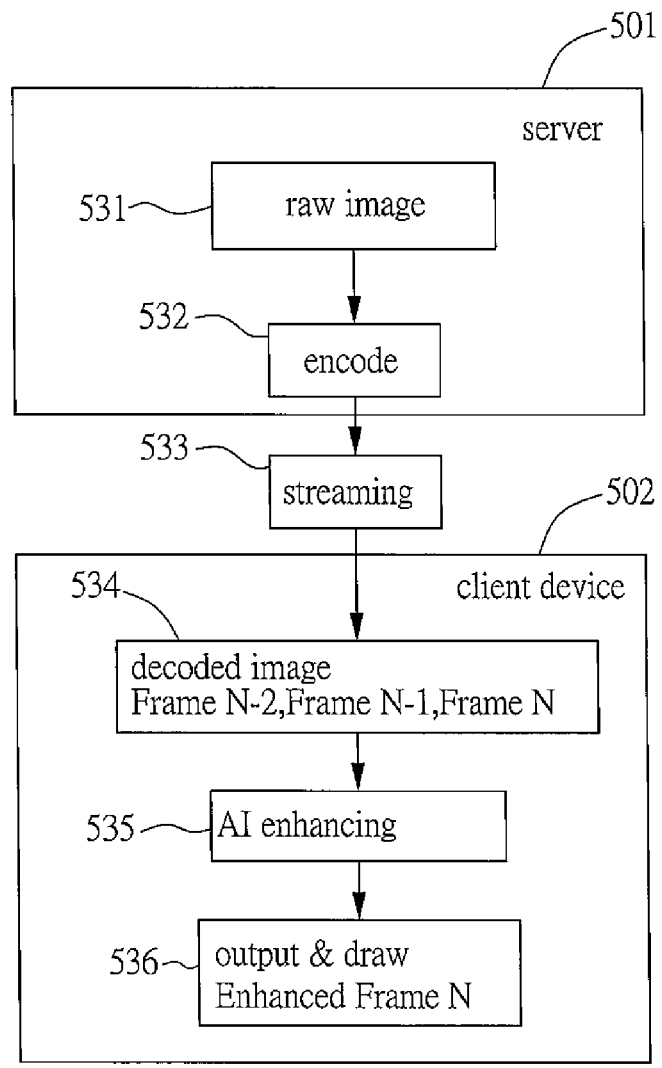
FIG. 13 is a schematic diagram showing yet another embodiment of the method for enhancing quality of media transmitted via network in accordance with the present invention.

Based on the neural network training process for generating an output image by inputting several images as shown in FIG. 12, an embodiment of the method for enhancing quality of media transmitted via network of the present invention is shown in FIG. 13. FIG. 13 is a schematic diagram showing yet another embodiment of the method for enhancing quality of media transmitted via network in accordance with the present invention, which comprises the following steps.

Step 531: providing a plurality of raw images (whose frames are represented by Frame(1), Frame(2), . . . , Frame (N−1), Frame(N); in which N is a positive integer) at a server 501. These raw images can be obtained from either a real-time video stream generated by a gaming program or other software, or a pre-recorded or pre-stored video saved in a memory. Then, these raw images are encoded and compressed by the encoder (Step 532) of the server 501 in order to generated a plurality of corresponding encoded images, the frames of these encoded images are represented by Encoded_Frame(1), Encoded_Frame(2), . . . , Encoded_Frame(N−1), Encoded_Frame(N); in which N is a positive integer. These encoded images are then transmitted as a format of 2D video stream (Step 533) to the client device via the network.

It is notable that, although in the embodiment illustrated in Steps 531-533 refers to the embodiment that the encoded images are transmitted via network such as Internet; however, in another embodiment of the invention, the encoded images and the 2D video stream thereof can also be video files that are pre-recorded or pre-stored in a portable memory medium (such as a flash drive, CD-ROM, SSD, hard disk, etc.), and can be directly accessed and read by the client device to obtain the encoded images and the 2D video stream thereof, without the need to receive them from the Internet. That is, the invention can also use the AI enhance module on the client device to enhance the quality of images in an offline state. After reading the video file from the portable memory medium, the image quality can be improved by the AI enhance module and then output and played on the screen of the client device. Therefore, the same neural network training method of the present invention can be used for video from other sources; such as images and video recorded by cameras, e-files of recorded videos, etc. Using the same neural network and machine learning methods can also improve the video quality of the aforementioned images or videos during playbacks. For example, playing videos of DVD resolution on a 4K TV, playing videos recorded by a smart-phone on a widescreen TV, adding frames for slow-motion playbacks, and so on.

Step 534: the client device 502 accepts and decodes these encoded images into a plurality of corresponding decoded images; wherein the frames of decoded images are represented by Decoded_Frame(1), Decoded_Frame(2), . . . , Decoded_Frame(N−1), Decoded_Frame(N); in which N is a positive integer. And then, the frame of the Nth accepted decoded image and the previous frame or frames corresponding to the Nth training raw image Frame (N), such like Decoded_Frame(N−2), Decoded_Frame(N−1), Decoded_Frame(N) are retrieved to proceed with the next Step 535. Wherein, when the value of N−2 or N−1 is less than 1, the Decoded_Frame (1) frame is used to replace the frames Decoded_Frame (N−2) and Decoded_Frame (N−1). And then, an AI enhance module (also referred as enhanced artificial neural network module, see Step 535) accepts the decoded images and processing the Nth frame of decoded image and its previous one or more frames such as Decoded_Frame(N−2), Decoded_Frame(N−1), Decoded_Frame(N) in order to generate a corresponding frame of an enhanced image to be the output image (also referred as Enhanced_Frame(N), see Step 536). That is, the AI enhance module can accept several (eg., three) sequential frames Decoded_Frame(N−2), Decoded_Frame(N−1), Decoded_Frame(N) of decoded images each time and output a frame Enhanced_Frame(N) of enhanced image as shown in Step 536. Wherein, the at least one training algorithm and their training weighted parameters used by the enhanced artificial neural network module of the AI enhance module are the same with the training algorithms and training weighted parameters used by the embodiment of the training process illustrated in FIG. 12.

In this embodiment, if the neural network is written as mathematical operation formula, it will have the following expressions:

$$X = \text{Decode}(\text{Video stream});$$

$$Y(N) = \text{Network}(X(N-2), X(N-1), X(n), W);$$

wherein, X=(X(1), X(2), X(3), . . . ); where X(N) is the Nth frame of the decoded video, that is, Decoded_Frame(N);

Network is a neural network or machine learning algorithm;

W is the trained weighted parameter;

Y (N) is the Nth frame after enhancement, which is Enhanced_Frame(N).

In the embodiments shown in FIG. 12 and FIG. 13, the Nth decoded frame and several previous frames thereof are used as the input of the neural network in order to generate the Nth enhanced (trained) frame. However, in another embodiment of the invention, the input of the neural network can also be the Nth decoded frame and its previous one and next one (that is, Decoded_Frame(N−1), Decoded_Frame (N), Decoded_Frame(N+1)) in order to generate the Nth enhanced (trained) frame. Or, the number of input frames can be other amount instead of three. Since the implementation of the training process of the neural network and the method for enhancing quality of media transmitted via network applied in this embodiment are generally similar to the embodiments previously illustrated in FIG. 12 and FIG. 13, no detailed descriptions will be provided.

Figure 14:
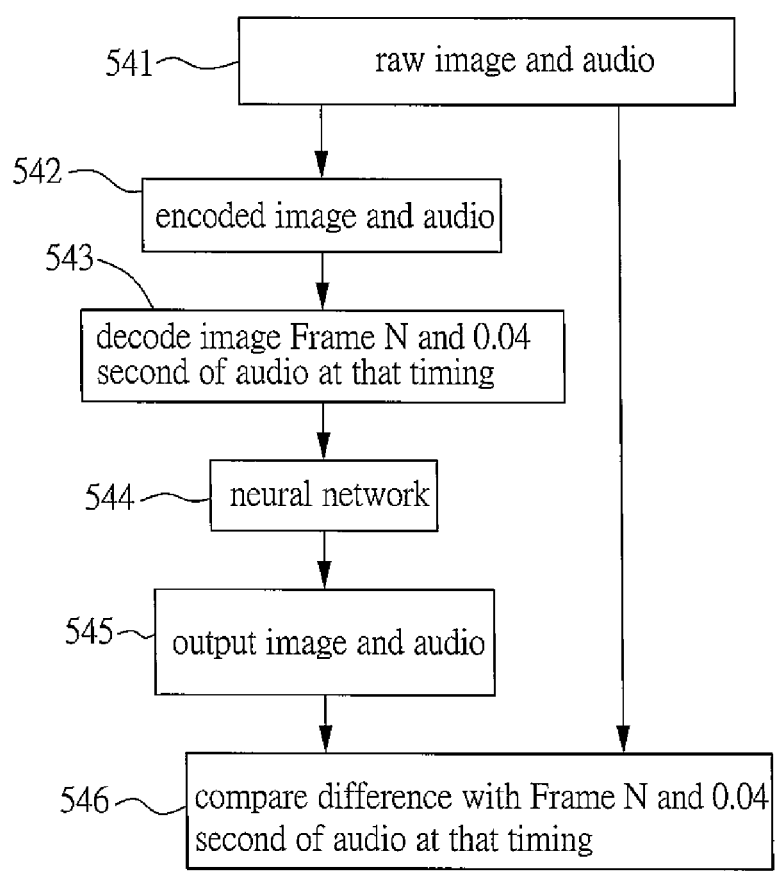
FIG. 14 is a schematic diagram showing a further embodiment (the sixth embodiment) of the training process of artificial neural network module in accordance with the present invention.

Please refer to FIG. 14, which is a schematic diagram showing a further embodiment (the sixth embodiment) of the training process of artificial neural network module in accordance with the present invention. In the training process of this embodiment, the input of the neural network may not be just a simple image, but also contains audio data. The training process of the embodiment shown in FIG. 14 comprises the following steps.

Step 541: providing a training video composed of a plurality of training raw images and audio data. These training raw images are represented by Frame(1), Frame(2), . . . , Frame(N−1), Frame(N); in which N is a positive integer. These training raw images and audio data can be obtained from either a real-time video stream generated by a gaming program or other software, or a pre-recorded or pre-stored video saved in a memory.

Step 542: these training raw images and audio data are encoded and compressed by the encoder to generated a training encoded video stream containing a plurality of corresponding training encoded images and encoded audio data, the frames of these training encoded images are represented by Encoded_Frame(1), Encoded_Frame(2), . . . , Encoded_Frame(N−1), Encoded_Frame(N); in which N is a positive integer.

Step 543: using a training decoder to decode the training encoded video stream. In which, the training encoded images contained in the training encoded video stream are decoded into a plurality of corresponding training decoded images one by one; wherein the frames of training decoded images are represented by Decoded_Frame(1), Decoded_Frame(2), . . . , Decoded_Frame(N−1), Decoded_Frame(N); in which N is a positive integer. In addition, the encoded audio data contained in the training encoded video stream are decoded and divided into a plurality of audio segments of a predetermined time interval according to the frame updating rate (frame per second; FPS) of the training encoded video stream; wherein the audio segments of training decoded audio data are represented by Audio(1), Audio (2), . . . , Audio (N−1), Audio (N); in which, each audio segment Audio (N) is corresponding to one frame of training decoded image Decoded_Frame(N). For example, if the frame updating rate of the training decoded video stream is 25 FPS, it means that each frame needs to be matched with ¹⁄₂₅ second, that is, 0.04 second audio segment; therefore, in Step 543, the received, decoded, and decompressed audio data is divided into a plurality of audio segments in units of 0.04 seconds.

Step 544: the artificial neural network module accepts the training decoded images and the divided audio segments, and then processes them one by one by using at least one training algorithm, in order to generate corresponding training output images and audio segments (see Step 545). The at least one training algorithm comprises a plurality of training weighted parameters.

Step 546: using the compare and train module to compare the differences between the training output images and audio segments and their corresponding training raw images Frame(N) and audio data provided in Step 541 one by one, so as to modify the training weighted parameters of the at least one training algorithm. The training weighted parameters being modified to minimize the differences between the training output images and audio segments and their corresponding training raw images and audio data. Because the way to modify the training weighted parameters is similar to the ones previously illustrated, no detailed description will be provided.

Figure 15:
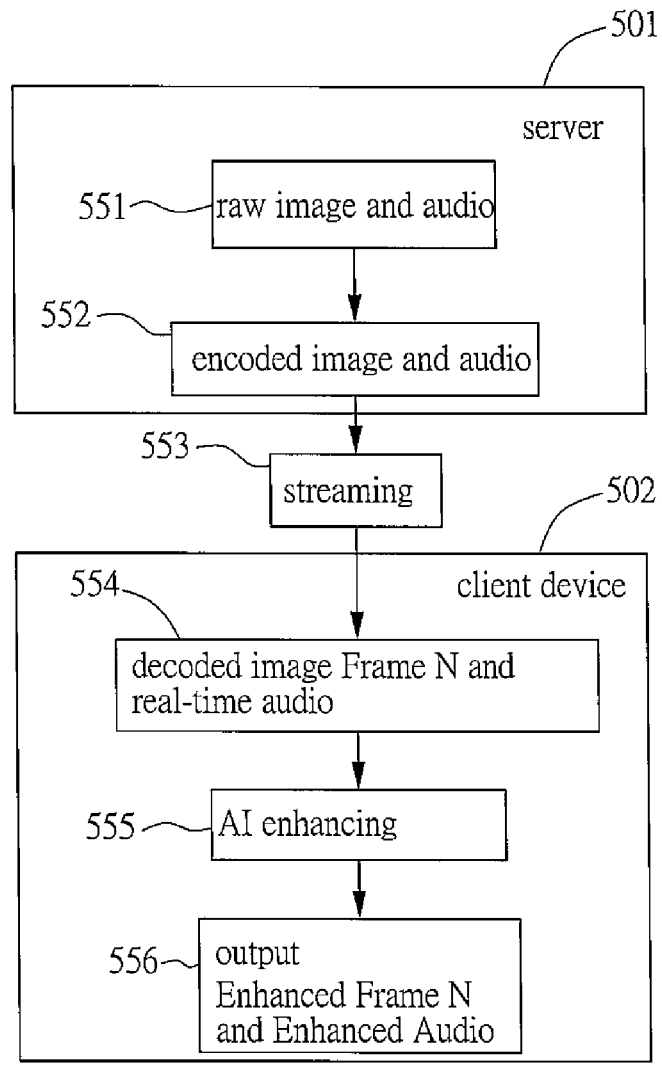
FIG. 15 is a schematic diagram showing yet a further embodiment of the method for enhancing quality of media transmitted via network in accordance with the present invention.

Based on the neural network training process for generating the output image and audio segment by inputting the decoded image and audio data as shown in FIG. 14, an embodiment of the method for enhancing quality of media transmitted via network of the present invention is shown in FIG. 15. FIG. 15 is a schematic diagram showing yet a further embodiment of the method for enhancing quality of media transmitted via network in accordance with the present invention, which comprises the following steps.

Step 551: providing a plurality of raw images and audio data (the frames of raw images are represented by Frame(1), Frame(2), . . . , Frame(N−1), Frame(N); in which N is a positive integer) at a server 501. These raw images and audio data are encoded and compressed by the encoder (Step 552) of the server in order to generated a plurality of corresponding encoded images and audio data. These encoded images and audio data are then transmitted as a format of 2D video stream (Step 553) to the client device via the network. As previously described, in another embodiment, the 2D video stream containing the encoded images and audio data can also be an e-file of pre-recorded or pre-stored video saved in a portable memory medium (such as a flash drive, CD-ROM, SSD, hard disk, etc.), and can be directly accessed and read by the client device to obtain the 2D video stream containing the encoded images and audio data.

Step 554: the client device 502 accepts and decodes these encoded images and audio data into a plurality of corresponding decoded images and audio segments. In addition, an AI enhance module (also referred as enhanced neural network module) to accept the Nth decoded image and its corresponding audio segment in order to generate a corresponding enhanced image and audio segament (also referred as Enhanced_Frame(N) and Enhanced_Audio(N); N is positive integer, see Step 556) to be as the output image and audio. Wherein, the at least one training algorithm and their training weighted parameters used by the enhanced neural network module of the AI enhance module are the same with the training algorithms and training weighted parameters used by the embodiment of the training process illustrated in FIG. 14.

In this embodiment, if the neural network is written as mathematical operation formula, it will have the following expressions:

$X$=Decode(Video/Audio stream);

$Y(N)$=Network($X(N-2), X(N-1), X(n), W$);

Wherein, $X$=($X(1), X(2), X(3), \ldots$ ); where $X(N)$ is the Nth frame of the decoded video and its corresponding audio segment;

Network is a neural network or machine learning algorithm;

W is the trained weighted parameter;

$Y(N)$ is the Nth frame and its corresponding audio segment after enhancement, which is Enhanced_Frame(N) and Enhanced_Audio(N).

Figure 16:
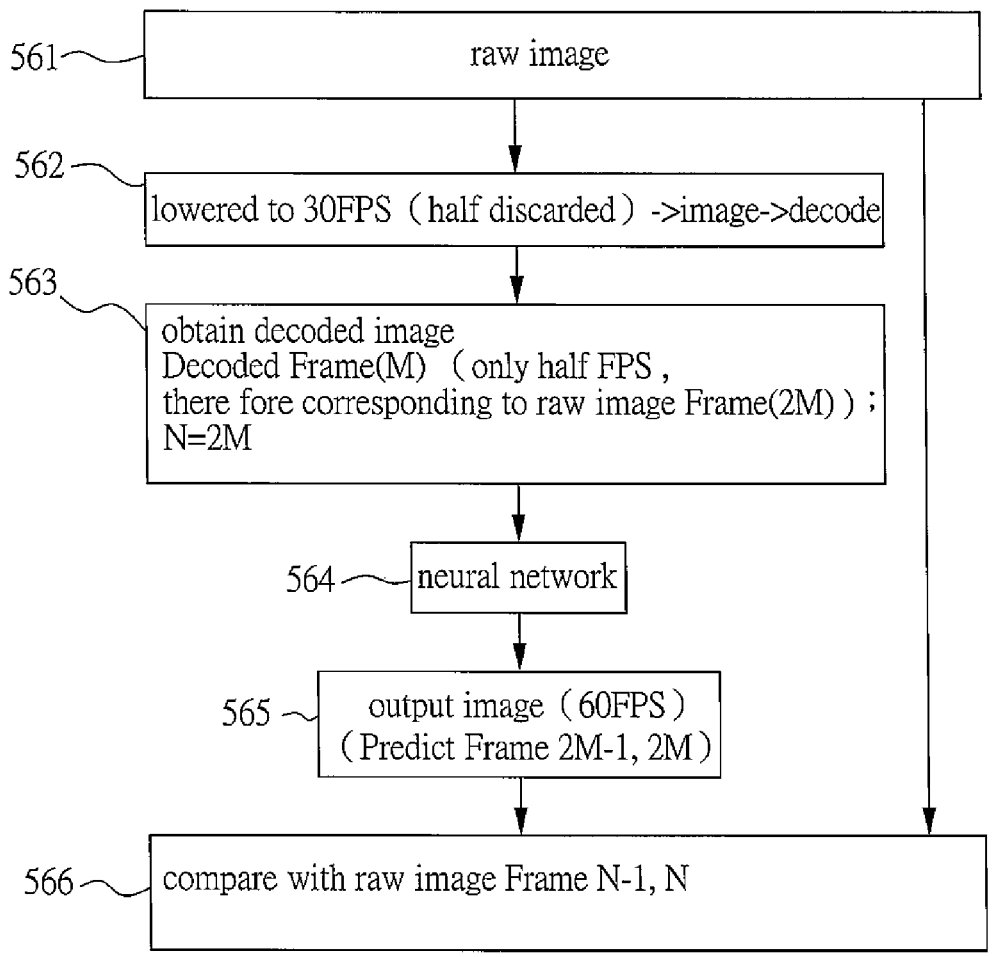
FIG. 16 is a schematic diagram showing a further embodiment (the seventh embodiment) of the training process of artificial neural network module in accordance with the present invention.

Please refer to FIG. 16, which is a schematic diagram showing a further embodiment (the seventh embodiment) of the training process of artificial neural network module in accordance with the present invention. In the training process of this embodiment, the input of the artificial neural network may contain a plurality of raw images with relatively lower FPS. The artificial neural network module can generate output images with higher FPS based on these raw images, so as to raise the FPS of video. The embodiment of the training process as shown in FIG. 16 comprises the following steps Step 561: providing a training video in a training mode. The training video is composed of a plurality of training raw images which can be obtained from either a real-time video stream generated by a gaming program or other software, or a pre-recorded or pre-stored video saved in a memory. In this embodiment, the frames of the plurality of training raw images (training video) have relatively higher FPS (such as 60 FPS or higher) and are represented by Frame(1), Frame(2), . . . , Frame(N−1), Frame(N); in which N is a positive integer.

Step 562: reducing the FPS of the training raw images (training video) by discarding some of the frames intermittently; for example, discarding singular or even frames in order to halve the number of frames per second in the lowered training raw images (halving the FPS, for example, slowed down to 30 FPS). The frames of the lowered training raw images are represented by L_Frame(1), L_Frame(2), . . . , L_Frame(M−1), L_Frame(M); in which M is a positive integer, and N=2M. That is, the content of the frame L_Frame(M) is the same as the frame Frame(2M), and the number 2M−1th frame Frame(2M−1) of training raw image will be discarded. Then, these lowered training raw images are encoded and then decoded in order to obtain the decoded training decoded images whose frames are represented by Decoded_Frame(1), Decoded_Frame(2) Decoded_Frame(M−1), Decoded_Frame(M), see FIG. 563. In this embodiment, because half of the frames in the training raw images were discarded, the FPS (frame rate) was lowered from 60 FPS to 30 FPS; therefore, the Decoded_Frame(M) of the Mth frame of the training decoded image is the result of the encoding and decoding of the 2Mth frame Frame(2M) of the training raw image.

Step 564: the artificial neural network module of the server accepting the training decoded images and processing the Mth frame of training decoded image and its previous and/or next one or more frames such as Decoded_Frame(M−n), . . . , Decoded_Frame(M), Decoded_Frame(M+m) according to the corresponding training raw image Frame(N) by using at least one training algorithm in order to generate two corresponding frames of training output images (also referred as Predict_Frame(N−1) and Predict_Frame(N), where N=2M, see Step 565). Wherein n and m are integers equal to or larger than zero. In addition, if M−n is smaller than one, then the frame Decoded_Frame(1) will be used to replace the frame Decoded_Frame(M−n); moreover, if M+m is larger than 2M, then the frame Decoded_Frame(2M) will be used to replace the frame Decoded_Frame(M+m) to be fed to and processed by the artificial neural network module. The at least one training algorithm includes a plurality of training weighted parameters. In other words, the artificial neural network module can receive several (eg., three, four or more) frames Decoded_Frame(M-n), . . . , Decoded_Frame(M), . . . , Decoded_Frame(M+m) of training decoded images each time and output two frames Predict_Frame(N−1) and Predict_Frame(N) of training output image as shown in Step 565.

Step 566: using the compare and train module to compare the differences between the frames Predict_Frame(N−1) and Predict_Frame(N) of training output images and their corresponding frames Frame(N−1) and Frame(N) of training raw images, so as to modify the training weighted parameters of the at least one training algorithm according to the differences therebetween. The training weighted parameters are modified to minimize the differences between the frames Predict_Frame(N−1) and Predict_Frame(N) of training output images and their corresponding frames Frame(N−1) and Frame(N) of training raw images. And then, using a mathematical optimization algorithm (such like Adam/SGD/RMSProp) to learn the weighted parameters of the artificial neural network, making the error as small as possible. Each time when the training weighted parameters are modified, the modified training weighted parameters are fed back to the at least one training algorithm for processing another training decoded image in Step 564. After a predetermined amount of the training output images and their corresponding training raw images are compared, and a predetermined times of the training weighted parameters are modified, the modified training weighted parameters are applied to the at least one algorithm of the AI enhance module of the client device.

Figure 17:
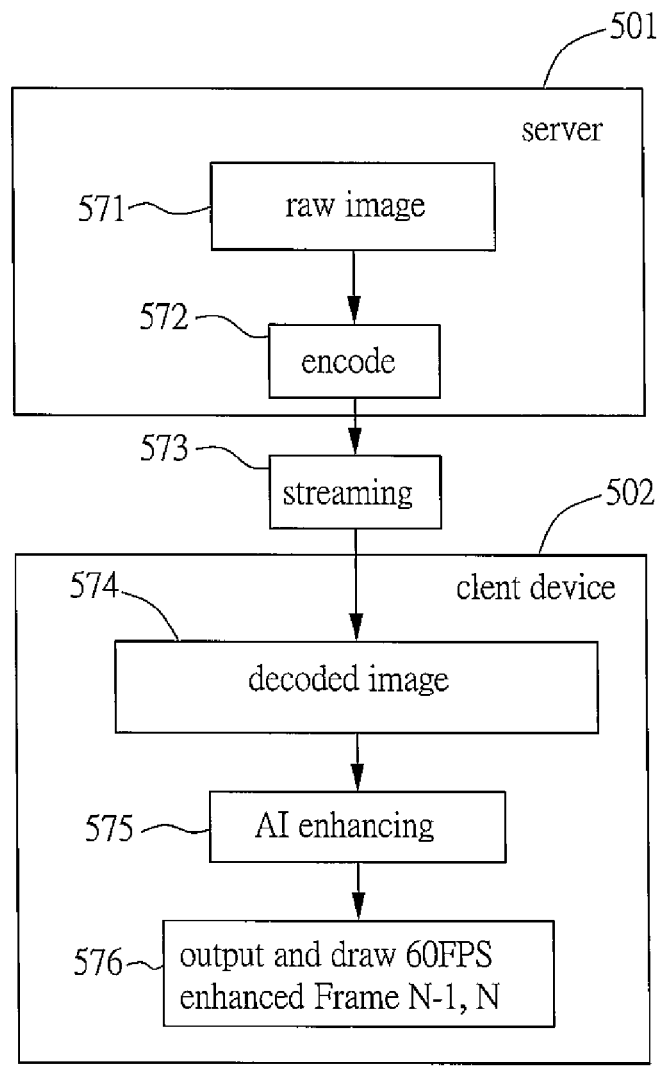
FIG. 17 is a schematic diagram showing yet one more embodiment of the method for enhancing quality of media transmitted via network in accordance with the present invention.

Based on the neural network training process for generating two output images by inputting several images as shown in FIG. 16, an embodiment of the method for enhancing quality of media transmitted via network of the present invention is shown in FIG. 17. FIG. 17 is a schematic diagram showing yet one more embodiment of the method for enhancing quality of media transmitted via network in accordance with the present invention, which comprises the following steps.

Step 571: providing a plurality of raw images with relatively lower FPS (whose frames are represented by Frame(1), Frame(2), . . . , Frame(M−1), Frame(M); in which M is a positive integer) at a server 501. These raw images can be obtained from either a real-time video stream generated by a gaming program or other software, or a pre-recorded or pre-stored video saved in a memory. Then, these raw images are encoded and compressed by the encoder (Step 572) of the server 501 in order to generated a plurality of corresponding encoded images, the frames of these encoded images are represented by Encoded_Frame(1), Encoded_Frame(2), . . . , Encoded_Frame(M−1), Encoded_Frame(M); in which M is a positive integer. These encoded images are then transmitted as a format of 2D video stream (Step 573) to the client device via the network.

Step 574: the client device 502 accepts and decodes these encoded images into a plurality of corresponding decoded images; wherein the frames of decoded images are represented by Decoded_Frame(1), Decoded_Frame(2), . . . , Decoded_Frame(M−1), Decoded_Frame(M); in which M is a positive integer. And then, the frame of the Mth accepted decoded image and its previous or next few frames, such like Decoded_Frame(M−n), . . . , Decoded_Frame(M), . . . , Decoded_Frame(M+m), are retrieved to proceed with the next Step 575; where m and n are integers greater than zero. In addition, if M−n is smaller than one, then the frame Decoded_Frame(1) will be used to replace the frame Decoded_Frame(M−n); moreover, if M+m is larger than 2M, then the frame Decoded_Frame(2M) will be used to replace the frame Decoded_Frame(M+m) to be fed to and processed by the AI enhance module. And then, the AI enhance module (also referred as enhanced artificial neural network module, see Step 575) accepts the decoded images and processing the Mth frame of decoded image and its previous and next few frames such as Decoded_Frame(M−n), . . . , Decoded_Frame(M), . . . , Decoded_Frame(M+m) in order to generate two corresponding frames of enhanced images to be the output images (also referred as Enhanced_Frame(N−1) and Enhanced_Frame(N), where N is a positive integer, see Step 576). That is, the AI enhance module can accept several (eg., three, four or more) sequential frames Decoded_Frame(M−n), . . . , Decoded_Frame(M), . . . , Decoded_Frame(M+m) of decoded images each time and output two frames Enhanced_Frame(N−1) and Enhanced_Frame(N) of enhanced output images, and then display these enhanced output images at a relatively higher frame rate such like 60 FPS, as shown in Step 576. Wherein, the at least one training algorithm and their training weighted parameters used by the enhanced artificial neural network module of the AI enhance module are the same with the training algorithms and training weighted parameters used by the embodiment of the training process illustrated in FIG. 16.

In this embodiment, if the neural network is written as mathematical operation formula, it will have the following expressions:

$$X=\text{Decode}(30\text{FPS Video stream});$$

$$Y(2M-1), Y(2M)=\text{Network}(X(M-n), \ldots, X(M), \ldots, X(M+n), W);$$

wherein, $X=(X(1), X(2), X(3), \ldots )$; where $X(M)$ is the Mth frame of the decoded video, that is, Decoded_Frame (M);

Network is a neural network or machine learning algorithm;

W is the trained weighted parameter;

Y (N) is the Nth frame after enhancement, which is Enhanced_Frame (N).

Figure 18:
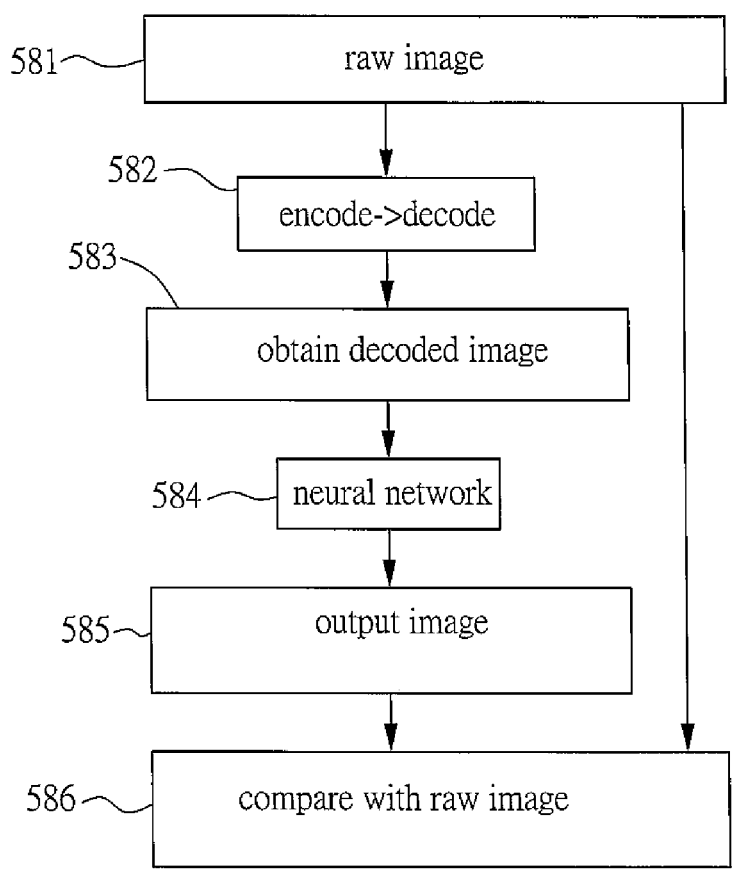
FIG. 18 is a schematic diagram showing one more embodiment (the eighth embodiment) of the training process of artificial neural network module in accordance with the present invention.

Please refer to FIG. 18, which is a schematic diagram showing one more embodiment (the eighth embodiment) of the training process of artificial neural network module in accordance with the present invention. Sometimes the network might drop frames. With this training process, the artificial neural network module can have the function of automatically filling in the predicted frames or filling up the missing frames in advance. In the training process of this embodiment, the input of the neural network might contain a plurality of images rather than one. The artificial neural network module can use the information from the previous images to fill-up or predict the missing frames. The embodiment of the training process as shown in FIG. 18 comprises the following steps Step 581: providing a training video in a training mode. The training video is composed of a plurality of training raw images which can be obtained from either a real-time video stream generated by a gaming program or other software, or a pre-recorded or pre-stored video saved in a memory. In this embodiment, the frames of the plurality of training raw images (training video) are represented by Frame(1), Frame(2), . . . , Frame(N−1), Frame(N); in which N is a positive integer.

Step 582: using an encoder to encode and compress the training raw images into a video stream composed of a plurality of training encoded images, and then, using a decoder to decode the training encoded images one by one in order to obtain a plurality of corresponding training decoded images whose frames are represented by Decoded_Frame(1), Decoded_Frame(2), . . . , Decoded_Frame(N−1), Decoded_Frame(N).

Step 583: assuming that the Nth frame Decoded_Frame (N) of the training decoded image is the frame that is missing or needs to be predicted, then, retrieving one or more frames before the Nth training decoded image frame Decoded_Frame(N−n), . . . , Decoded_Frame(N−1) in order to proceed with the next Step 584. Wherein, n is a positive integer and n<N.

Step 584: the artificial neural network module of the server accepting the training decoded images and processing the one or several frames previous to the Nth frame, such as Decoded_Frame(N−n), . . . , Decoded_Frame(N−1), by using at least one training algorithm in order to generate a corresponding frame of training output image (also referred as Predict_Frame(N), see Step 585). If a number of consecutive frames are missing or need to be predicted, the frame Predict_Frame(N) of the training output image generated in this step 584 can be used as the Nth frame of the decoded image and sent back to the artificial neural network module for calculating the next frame Predict_Frame(N+1) of the training output image; and so on. The artificial neural network module can continue to feed the frames Predict_Frame(N), Predict_Frame(N+1) of the training output images generated by itself back to the artificial neural network module; in order to continuously calculate (predict) the subsequent frames of the training output images. In other words, in this embodiment, The frames (Decoded_Frame (N−n), . . . , Decoded_Frame(N−1)) of several training decoded images before the Nth frame can be input into the artificial neural network module in order to generate subsequent frames including the Nth frame (Predict_Frame(N), Predict_Frame(N+1), . . . , Predict_Frame(N+m)); where m is an integer, see Step 585.

Step 586: using the compare and train module to compare the differences between the frames (Predict_Frame(N), Predict_Frame(N+1), . . . , Predict_Frame(N+m)) of training output images and their corresponding frames Frame(N), Frame(N+1), . . . , Frame(N+m) of training raw images provided in Step 581, so as to modify the training weighted parameters of the at least one training algorithm according to the differences. The training weighted parameters are modified to minimize the differences between the frame Predict_Frame(N) of training output images and its corresponding frame Frame(N) of training raw image. And then, using a mathematical optimization algorithm (such like Adam/SGD/RMSProp) to learn the weighted parameters of the artificial neural network, making the error as small as possible. Each time when the training weighted parameters are modified, the modified training weighted parameters are fed back to the at least one training algorithm for processing another training decoded image in Step 584. After a predetermined amount of the training output images and their corresponding training raw images are compared, and a predetermined times of the training weighted parameters are modified, the modified training weighted parameters are applied to the at least one algorithm of the AI enhance module of the client device.

Figure 19:
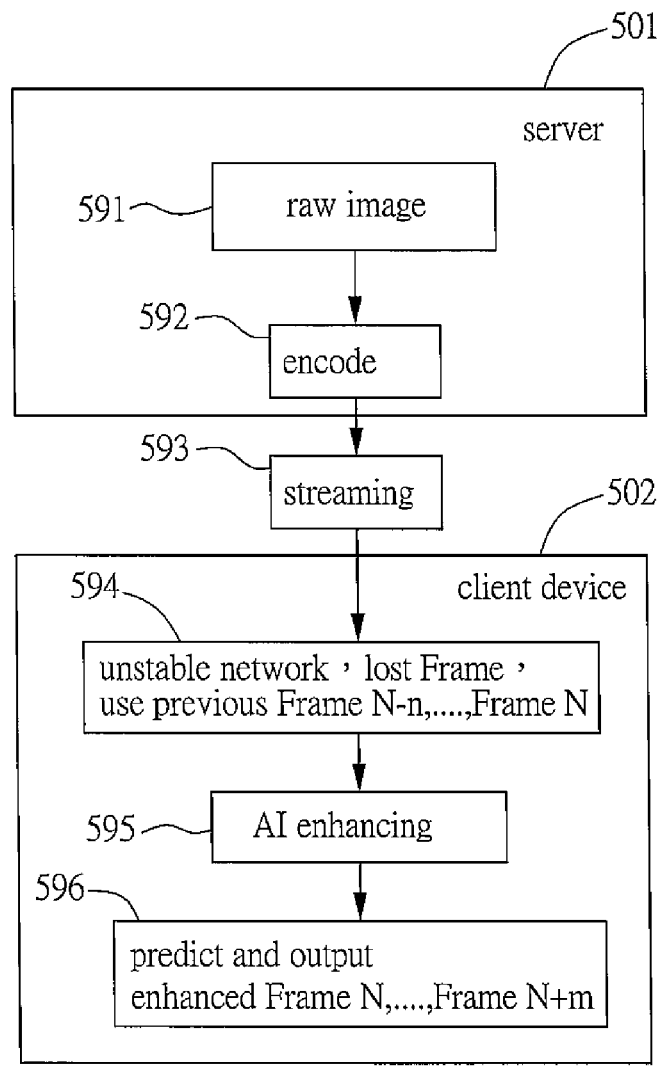
FIG. 19 is a schematic diagram showing even one more embodiment of the method for enhancing quality of media transmitted via network in accordance with the present invention.

Based on the neural network training process for generating the Nth frame and its consecutive frames of output image by inputting several previous frames as shown in FIG. 18, an embodiment of the method for enhancing quality of media transmitted via network of the present invention is shown in FIG. 19. FIG. 19 is a schematic diagram showing even one more embodiment of the method for enhancing quality of media transmitted via network in accordance with the present invention, which comprises the following steps.

Step 591: providing a plurality of raw images (whose frames are represented by Frame(1), Frame(2), . . . , Frame (N−1), Frame(N); in which N is a positive integer) at a server 501. These raw images can be obtained from either a real-time video stream generated by a gaming program or other software, or a pre-recorded or pre-stored video saved in a memory. Then, these raw images are encoded and compressed by the encoder (Step 592) of the server 501 in order to generated a plurality of corresponding encoded images, the frames of these encoded images are represented by Encoded_Frame(1), Encoded_Frame(2), . . . , Encoded_Frame(N−1), Encoded_Frame(N). These encoded images are then transmitted as a format of 2D video stream (Step 593) to the client device via the network.

Step 594: the client device 502 accepts and decodes these encoded images into a plurality of corresponding decoded images; wherein the frames of decoded images are represented by Decoded_Frame(1), Decoded_Frame(2), . . . , Decoded_Frame(N−1), Decoded_Frame(N). Then, assuming that the Nth frame or several (m) consecutive frames starting from the Nth frame are lost during the network transmission due to unstable network, as shown in Step 594, the training process of the invention will retrieve one or several frames before the Nth frame of the decoded images, such as Decoded_Frame(N−n), . . . , Decoded_Frame(N−1), in order to proceed with the next Step 595.

Step 595: And then, the AI enhance module (also referred as enhanced artificial neural network module) accepts the one or several frames before the Nth frame of the decoded images, such as Decoded_Frame(N−n), . . . , Decoded_Frame(N−1), in order to generate one or several (m+1) corresponding frames of enhanced images to be the output images, such as Enhanced_Frame(N), . . . , Enhanced_Frame (N+m), see Step 596. That is, the AI enhance module can accept several frames Decoded_Frame(N−n), . . . , Decoded_Frame(N−1) of decoded images each time and output one or several consecutive frames Enhanced_Frame(N) and Enhanced_Frame(N+m) of enhanced output images. Wherein, the at least one training algorithm and their training weighted parameters used by the enhanced artificial neural network module of the AI enhance module are the same with the training algorithms and training weighted parameters used by the embodiment of the training process illustrated in FIG. 18.

In this embodiment, if the neural network is written as mathematical operation formula, it will have the following expressions:

$$X=\text{Decode}(\text{Video stream});$$

$$Y(N),Y(N+m)=\text{Network}(X(N-n),X(n),W);$$

wherein, X=(X(1), X(2), X(3), . . . ); where X(N) is the Nth frame of the decoded video, that is, Decoded_Frame(N);

Network is a neural network or machine learning algorithm;

W is the trained weighted parameter;

Y (N) is the Nth frame after enhancement, which is Enhanced_Frame (N).

Figure 20:
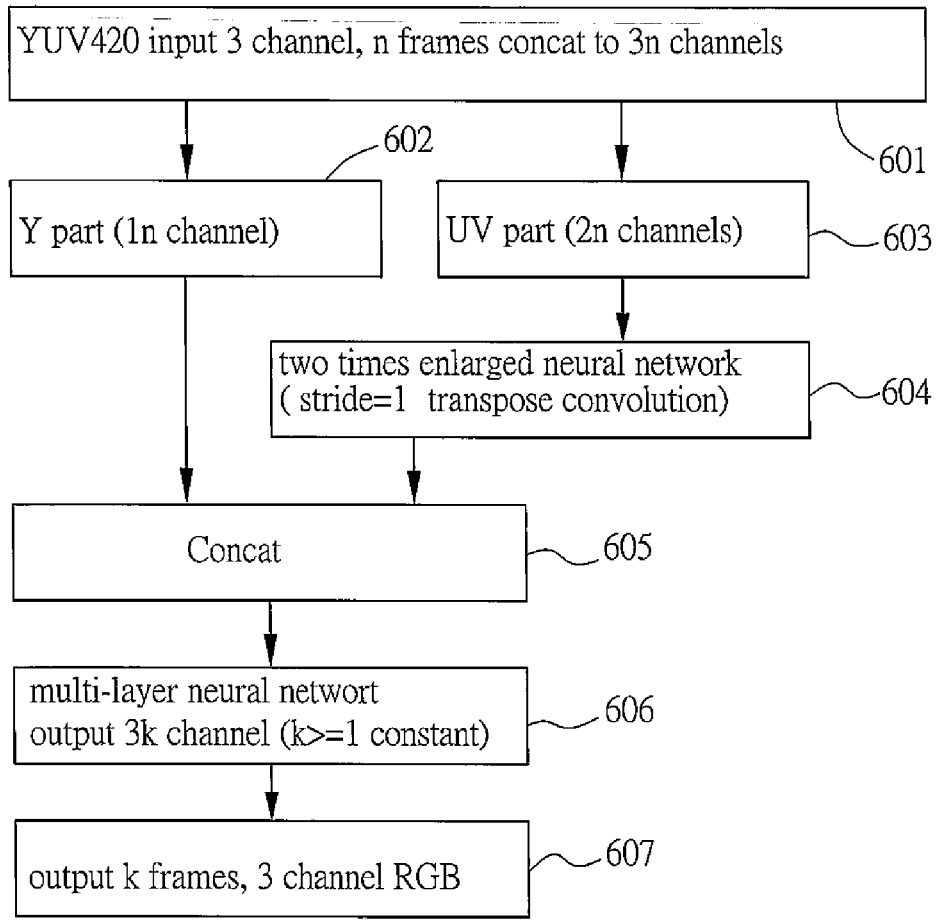
FIG. 20 is a schematic diagram showing a further embodiment of process to handle the decoded images with YUV420 format in accordance with the invention.

FIG. 20 is a schematic diagram showing a further embodiment of process to handle the decoded images with YUV420 format in accordance with the invention. In practice, assuming that each frame has m channels (such as RGB video, m=3), X(N−k+1), . . . , X(N−1), X(N) will be concatenated (Concat) based on the channel to act as an input of mk channels. If the original video has m channels per frame, input k frames, and the input can be regarded as mk channels. Based on this principle, as shown in FIG. 20, the process for handling the decoded image with YUV420 format according to the present invention comprises:

Step 601, the neural network accepts and processes the training decoded images of YUV420 color coding format by using the following steps, wherein, the training decoded images comprise 3 channels, and n frames Concat (concatenate) into 3n channels, where n is a positive integer;

Step 602, extracts Y-part data of the training decoded images in order to generate Y-part output data, which have n channels;

Step 603, extracts UV-part data of the training decoded images, which have 2n channels;

Step 604, uses two-times amplified neural network to process the UV-part data of the training decoded images in order to generate UV-part output data with 2n channels (ex. Stride=2 in transpose convolution; see Step 604);

Step 605, Concat (concatenates) the Y-part output data and the UV-part output data;

Step 606, uses a multi-layer neural network to receive the concatenated data from Step 605 and generates 3k channels based on the concatenated data (wherein k is a constant that is a positive integer larger than one);

Step 607, outputs the data generated in Step 606 as the training output image with k frames and 3 channels of RGB.

Figures 21A, 21B:
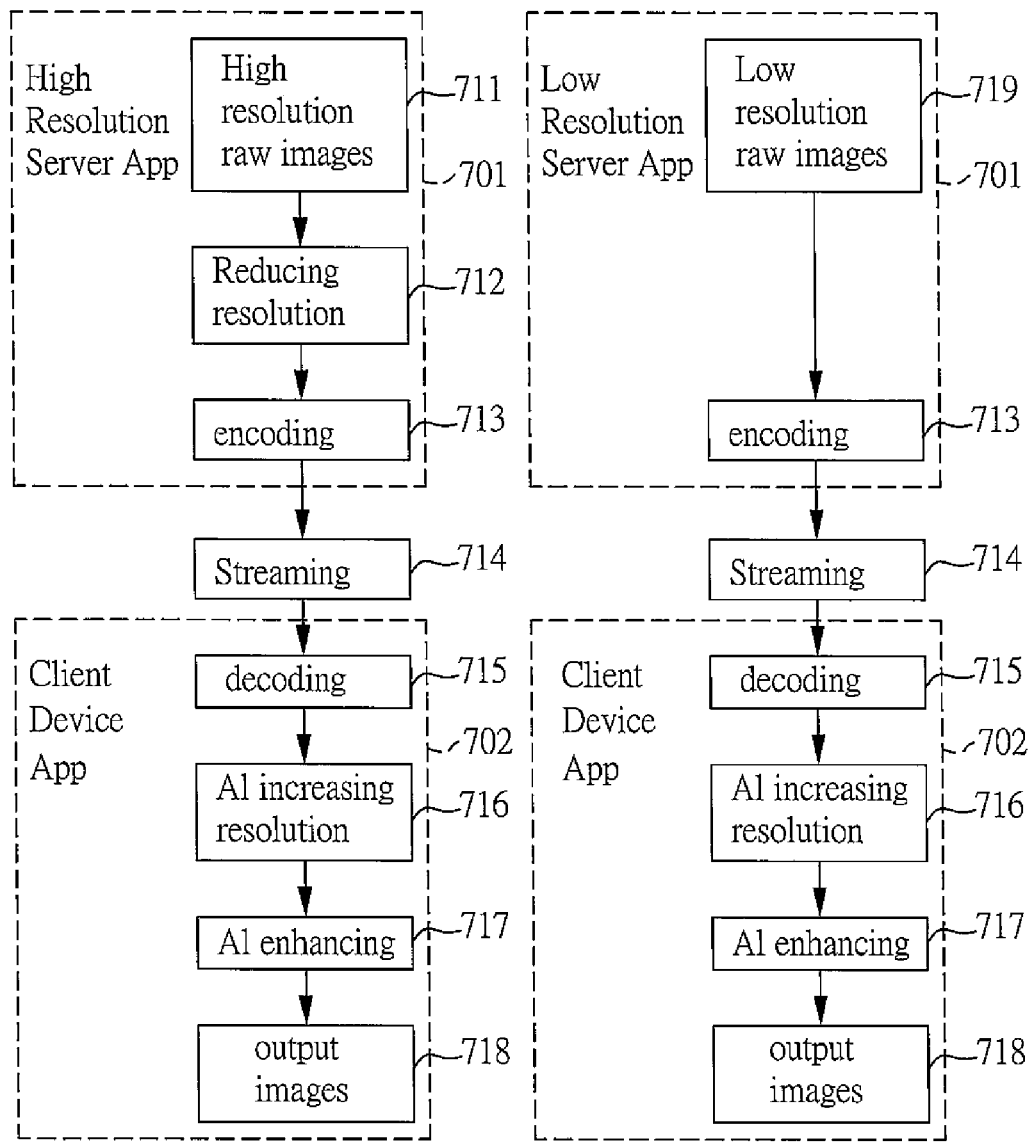
FIG. 21A is a schematic diagram showing yet another embodiment of the method for enhancing quality of media transmitted via network in accordance with the present invention.
FIG. 21B is a schematic diagram showing yet another embodiment of the method for enhancing quality of media transmitted via network in accordance with the present invention.

FIG. 21A is a schematic diagram showing yet another embodiment of the method for enhancing quality of media transmitted via network in accordance with the present invention, which comprises the following steps.

Step 711, executes a first application in a server 701 according to at least one command in order to generate a plurality of high resolution raw images. These high resolution raw images have a resolution of 4K or higher which is referred as the second resolution. The at least one command is generated at a client device 702 and transmitted to the server 701 via a network.

Step 712, uses a sampling method in the server 701 to reduce the resolution of the high resolution raw images in order to obtain a plurality of source images with low resolution of 1080i, 720p or lower which is referred as the first resolution and is lower than the second resolution.

Step 713, uses an encoder in the server 701 to encode the source images in order to generate a plurality of encoded images.

Step 714, transmits the encoded images as a video streaming to the client device 702 via the network according to the at least one command. Because the resolution of the source images is lower than which of the raw images, thereby the bandwidth required for transmitting the encoded images of these source images is also less than which required for transmitting encoded images of the raw images.

Step 715, the client device 702 accepts the encoded images and decodes the accepted encoded images into a plurality of decoded images.

In the present invention, the client device 702 includes an artificial intelligence (AI) enhance module. The AI enhance module comprises at least one predefined algorithm. The at least one predefined algorithm comprises a plurality of weighted parameters. The weighted parameters of the at least one predefined algorithm are defined in advance by a training process of an artificial neural network module executed in a training server. A second application is executed in the client device 702. The second application is relevant to and cooperative with the first application in such a manner that, the client device 702 is operable by a user to generate the command. The client device 702 transmits the command to the server 701 via the network, and receives the encoded images from the server 701 via the network according to the command.

In this embodiment, the at least one predefined algorithm comprises a first predefined AI algorithm and a second predefined AI algorithm. The first predefined AI algorithm comprises a plurality of first weighted parameters. The second predefined AI algorithm comprises a plurality of second weighted parameters. The first predefined AI algorithm and the first weighted parameters are capable of increasing resolution of images, such that the resolution of images processed by the first predefined AI algorithm and the first weighted parameters will be increased from the first resolution to the second resolution. The second predefined AI algorithm and the second weighted parameters are capable of enhancing quality of images, such that the quality of images processed by the second predefined AI algorithm and the second weighted parameters will be better than the decoded images.

Step 716, after the client device 702 decodes the accepted encoded images into the decoded images, the client device 702 first uses the first predefined AI algorithm and the first weighted parameters to process the decoded images in order to generate a plurality of resolution-increased images having the second resolution. And then, in Step 717, the client device 702 uses the second predefined AI algorithm and the second weighted parameters to process the resolution-increased images in order to generate a plurality of enhanced images having the second resolution. And then, the client device 702 outputs the enhanced images (Step 718) to a screen (display panel) as displayed output images.

Wherein, the first predefined AI algorithm is pre-defined by analyzing differences between the source images with low resolution and the raw images with high resolution in such a manner that, the resolution-increased images are visually more similar to the raw images than the source images do. In addition, the second predefined AI algorithm is pre-defined by analyzing differences between the decoded images and the raw images in such a manner that, the enhanced images are visually more similar to the raw images than the decoded images do.

FIG. 21B is a schematic diagram showing yet another embodiment of the method for enhancing quality of media transmitted via network in accordance with the present invention. Since most of the steps shown in FIG. 21B are the same or similar to the steps described in FIG. 21A, thereby the same or similar steps will be directly given the same numerals and the details thereof will not be repeated. In the embodiment shown in FIG. 21B, the first application executed in the server 701 will generate a plurality of source images having the first resolution (Step 719). That means, in the Step 719 of this embodiment, the server 701 will directly generate the low resolution source images. No resolution reducing process is required. And then, these source images are processed by the same Steps 713 to 718 as which previously illustrated in FIG. 21A.

Figures 22A, 22B:
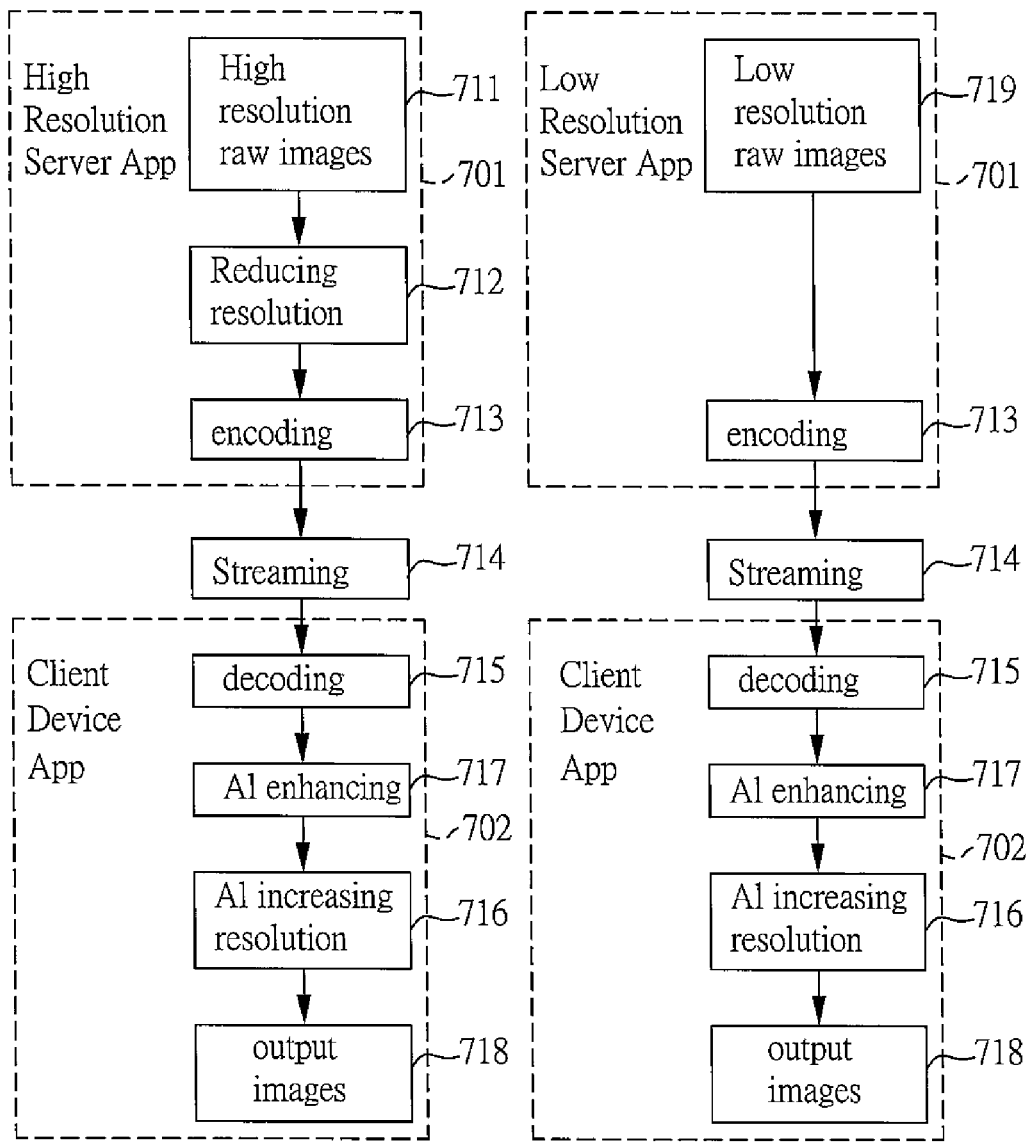
FIG. 22A is a schematic diagram showing yet another embodiment of the method for enhancing quality of media transmitted via network in accordance with the present invention.
FIG. 22B is a schematic diagram showing yet another embodiment of the method for enhancing quality of media transmitted via network in accordance with the present invention.

FIG. 22A is a schematic diagram showing yet another embodiment of the method for enhancing quality of media transmitted via network in accordance with the present invention. Since most of the steps shown in FIG. 22A are the same or similar to the steps described in FIG. 21A and FIG. 21B, thereby the same or similar steps will be directly given the same numerals and the details thereof will not be repeated. In the embodiment shown in FIG. 22A, the first application executed in the server 701 generates a plurality of raw images having the second resolution (Step 711). These raw images are then processed to reduce the resolution in order to obtain the source images having the first resolution (Step 712) which is lower than the second resolution. The source images are then encoded (Step 713) and transmitted (Step 714) to the client device 702. The client device 702 then decodes the encoded images into the decoded images (Step 715). And then, in this embodiment shown in FIG. 22A, the client device 702 first uses the second predefined AI algorithm and the second weighted parameters to process the decoded images in order to generate the enhanced images having the first resolution in Step 717. And then, in Step 716, the client device 702 uses the first predefined AI algorithm and the first weighted parameters to process the enhanced images in order to generate a plurality of resolution-increased images having the second resolution. After that, the client device 702 outputs the resolution-increased images (Step 718) to the screen (display panel) as displayed output images.

FIG. 22B is a schematic diagram showing yet another embodiment of the method for enhancing quality of media transmitted via network in accordance with the present invention. Since most of the steps shown in FIG. 22B are the same or similar to the steps described in FIG. 22A and FIG. 21A, thereby the same or similar steps will be directly given the same numerals and the details thereof will not be repeated. In the embodiment shown in FIG. 22B, the first application executed in the server 701 will generate a plurality of source images having the first resolution (Step 719). That means, in the Step 719 of this embodiment, the server 701 will directly generate the low resolution source images. No resolution reducing process is required. And then, these source images are processed by the same Steps 713 to 718 as which previously illustrated in FIG. 22A and FIG. 21A.

Figure 23:
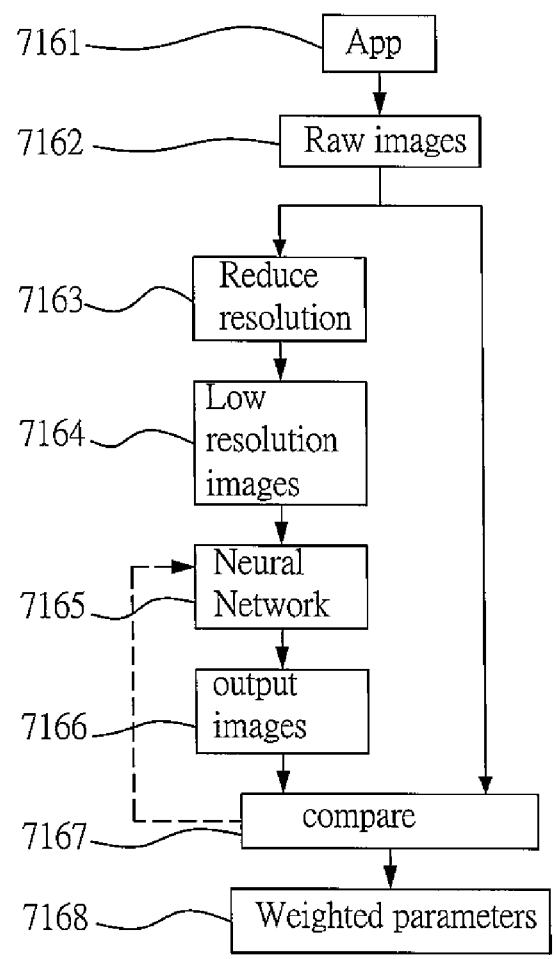
FIG. 23 is a schematic diagram showing an embodiment of the training process of the first predefined M algorithm and the first weighted parameters of the artificial neural network module in accordance with the present invention.

FIG. 23 is a schematic diagram showing an embodiment of the training process of the first predefined AI algorithm and the first weighted parameters of the artificial neural network module in accordance with the present invention. In the present invention, the first predefined AI algorithm and the first weighted parameters of the AI enhance module of the client device 702 are trained and defined by a training process of the artificial neural network module performed in the training server. After the training process is completed, the first predefined AI algorithm and the first weighted parameters are applied to the AI enhance module of the client device 702 for processing the Step 716 shown in FIGS. 21A, 21B, 22A and 22B. The training process of the first predefined AI algorithm and the first weighted parameters executed in the training server comprises the following steps:

Step 7161: starting a training mode in the training server and executing the first application in the training mode to generate a plurality of training raw images. The training raw images have the second resolution (high resolution) (Step 7162).

Step 7163: performing a resolution reducing process for reducing the resolution of the training raw images from the second resolution down to the first resolution in order to generate a plurality of training low-resolution images having the first resolution (Step 7164).

Step 7165: the artificial neural network module accepting the training low-resolution images and processing the training low-resolution images one by one by using the first training algorithm in order to generate a plurality of training output images having the second resolution (Step 7166). The first training algorithm has a plurality of first training weighted parameters to be trained.

Step 7167: using a compare module to compare the differences between the training output images and their corresponding training raw images one by one, so as to modify the first training weighted parameters of the first training algorithm according to the differences between each training output image and its corresponding training raw image. The first training weighted parameters are modified to minimize the differences between the training output images and their corresponding training raw images. Each time when the first training weighted parameters are modified, the modified first training weighted parameters are fed back to the first training algorithm for processing another (the next one) training low-resolution image. Wherein, after a predetermined amount of the training output images and their corresponding training raw images are compared, and a predetermined times of the first training weighted parameters are modified, the first training weighted parameters are applied to the first predefined algorithm of the AI enhance module of the client device for processing the AI increasing resolution Step 716 shown in FIGS. 21A, 21B, 22A and 22B.

In this embodiment, the training process of the second predefined AI algorithm and the second weighted parameters of the AI enhance module of the client device 702 is the same as the training process of artificial neural network module 105 previously illustrated in any one of FIG. 4, 5, 6 or 11. After the training process is completed, the second predefined AI algorithm and the second weighted parameters are applied to the AI enhance module of the client device 702 for processing the AI enhancing Step 717 shown in FIGS. 21A, 21B, 22A and 22B.

Figures 24A, 24B:
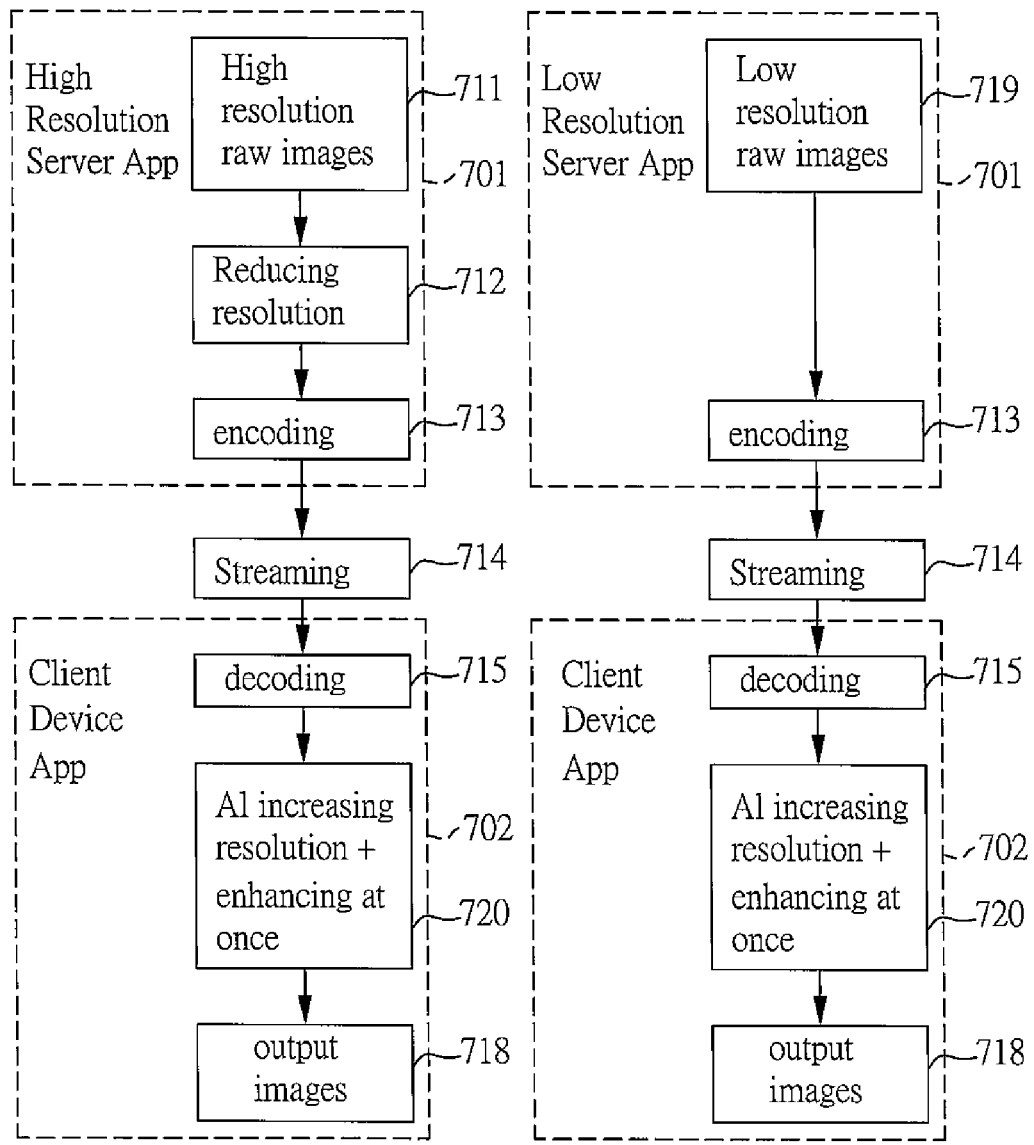
FIG. 24A is a schematic diagram showing yet another embodiment of the method for enhancing quality of media transmitted via network in accordance with the present invention.
FIG. 24B is a schematic diagram showing yet another embodiment of the method for enhancing quality of media transmitted via network in accordance with the present invention.

FIG. 24A is a schematic diagram showing yet another embodiment of the method for enhancing quality of media transmitted via network in accordance with the present invention. Since most of the steps shown in FIG. 24A are the same or similar to the steps described in FIG. 21A, thereby the same or similar steps will be directly given the same numerals and the details thereof will not be repeated. In the embodiment shown in FIG. 24A, the first application executed in the server 701 will generate a plurality of raw images having the second resolution (Step 711). These raw images are then processed to reduce the resolution in order to obtain the source images having the first resolution (Step 712) which is lower than the second resolution. The source images are then encoded (Step 713) and transmitted (Step 714) to the client device 702. The client device 702 then decodes the encoded images into the decoded images (Step 715). In this embodiment, the first predefined AI algorithm, the second predefined AI algorithm, the first weighted parameters and the second weighted parameters are all included in the AI enhance module of the client device 702 for processing the decoded images at once in order to obtain the enhanced images having the second resolution. Therefore, in Step 720, the AI enhance module of the client device 702 accepts and processes the decoded images by using the first predefined AI algorithm, the second predefined AI algorithm, the first weighted parameters and the second weighted parameters of the AI enhance module of the client device 702 in order to generate corresponding enhanced images having the second resolution. After that, the client device 702 outputs the enhanced images (Step 718) to the screen (display panel) as displayed output images.

FIG. 24B is a schematic diagram showing yet another embodiment of the method for enhancing quality of media transmitted via network in accordance with the present invention. Since most of the steps shown in FIG. 24B are the same or similar to the steps described in FIG. 24A and FIG. 21B, thereby the same or similar steps will be directly given the same numerals and the details thereof will not be repeated. In the embodiment shown in FIG. 24B, the first application executed in the server 701 will generate a plurality of source images having the first resolution (Step 719). And then, these source images are processed by the same Steps 713, 714, 715, 720 and 718 as which previously illustrated in FIG. 24A and FIG. 21B.

Figure 25:
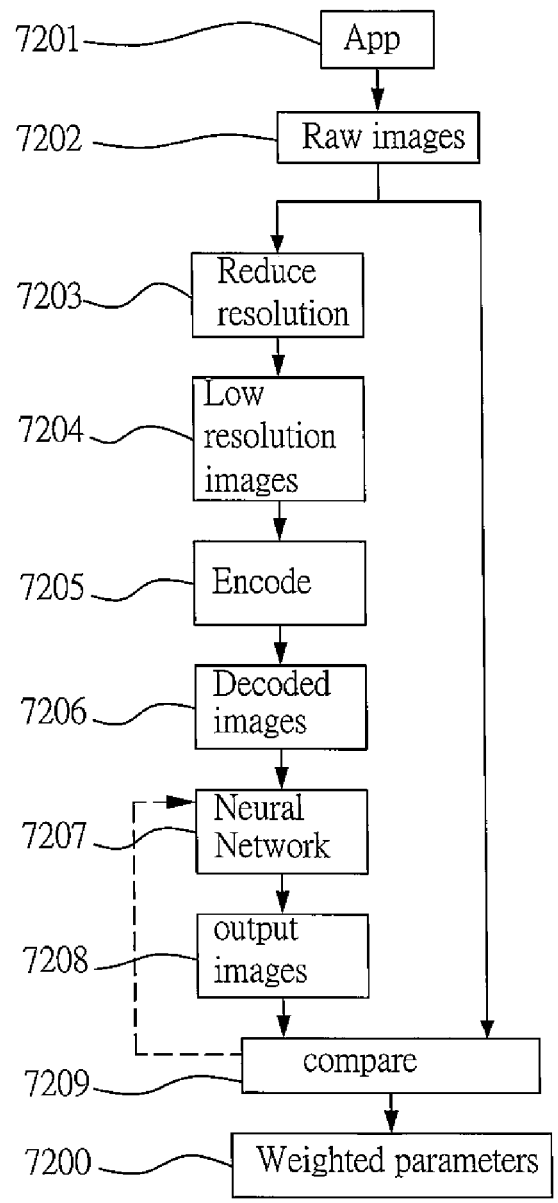
FIG. 25 is a schematic diagram showing an embodiment of the training process of the first predefined AI algorithm, the second predefined AI algorithm, the first weighted parameters and the second weighted parameters of the artificial neural network module in accordance with the present invention.

FIG. 25 is a schematic diagram showing an embodiment of the training process of the first predefined AI algorithm, the second predefined AI algorithm, the first weighted parameters and the second weighted parameters of the artificial neural network module in accordance with the present invention. In the present invention, the first predefined AI algorithm, the second predefined AI algorithm, the first weighted parameters and the second weighted parameters of the AI enhance module of the client device 702 are trained and defined at once by a training process of the artificial neural network module performed in the training server. After the training process is completed, the first predefined AI algorithm, the second predefined AI algorithm, the first weighted parameters and the second weighted parameters are applied to the AI enhance module of the client device 702 for processing the Step 720 shown in FIG. 24A and FIG. 24B. The training process of the first predefined AI algorithm, the second predefined AI algorithm, the first weighted parameters and the second weighted parameters executed in the training server comprises the following steps:

Step 7201: starting a training mode in the training server and executing the first application in the training mode to generate a plurality of training raw images. The training raw images have the second resolution (high resolution) (Step 7202).

Step 7203: performing a resolution reducing process for reducing the resolution of the training raw images from the second resolution down to the first resolution in order to generate a plurality of training low-resolution images having the first resolution (Step 7204).

Step 7205: encoding the training low-resolution images into a plurality of training encoded images by using an encoder of the training server.

Step 7206: decoding the training encoded images into a plurality of training decoded images by using a training decoder of the training server.

Step 7207: the artificial neural network module accepting the training decoded images and processing the training decoded images one by one by using the first training algorithm and the second training algorithm in order to generate a plurality of training output images having the second resolution (Step 7208). The first training algorithm has a plurality of first training weighted parameters to be trained. The second training algorithm has a plurality of second training weighted parameters to be trained.

Step 7209: using a compare module to compare the differences between the training output images and their corresponding training raw images one by one, so as to modify the first training weighted parameters and the second training weighted parameters according to the differences between each training output image and its corresponding training raw image. The first training weighted parameters and the second training weighted parameters are modified to minimize the differences between the training output images and their corresponding training raw images. Each time when the first training weighted parameters and the second training weighted parameters are modified, the modified first training weighted parameters and the second training weighted parameters are respectively fed back to the first training algorithm and the second training algorithm for processing another (the next one) training decoded image. Wherein, after a predetermined amount of the training output images and their corresponding training raw images are compared, and a predetermined times of the first training weighted parameters and the second training weighted parameters are modified, the first training weighted parameters and the second training weighted parameters are applied to the first predefined algorithm and the second predefined algorithm of the AI enhance module of the client device for processing the "AI increasing resolution+enhancing at once" Step 720 shown in FIG. 24A and FIG. 24B.

In a preferred embodiment of the invention, the AI enhance module of the client device 702 includes only one single set of predefined AI algorithm and weighted parameters which were trained by using the artificial neural network module illustrated in Steps 7207 to 7209 of FIG. 25 in order to provide functions of both the AI increasing resolution and the AI enhancing quality to the decoded images as shown in Step 720 of FIG. 24A and FIG. 24B.

Figure 26:
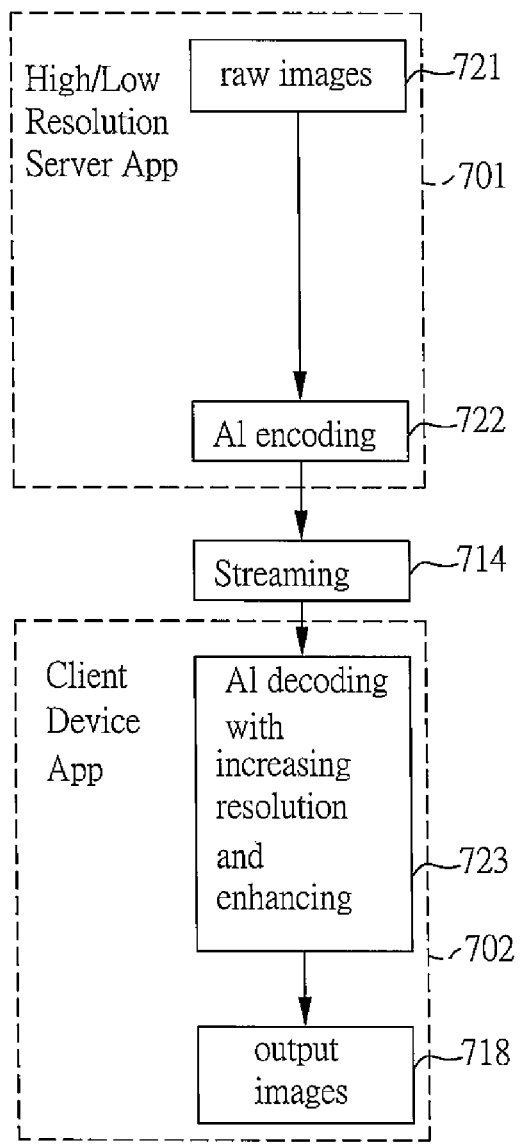
FIG. 26 is a schematic diagram showing yet another embodiment of the method for enhancing quality of media transmitted via network in accordance with the present invention.

FIG. 26 is a schematic diagram showing yet another embodiment of the method for enhancing quality of media transmitted via network in accordance with the present invention. Since most of the steps shown in FIG. 26 are the same or similar to the steps described in FIG. 24A and FIG. 24B, thereby the same or similar steps will be directly given the same numerals and the details thereof will not be repeated. In the embodiment shown in FIG. 26, the server further includes an AI encoding module. The first application executed in the server 701 will generate a plurality of raw images (Step 721) according to at least one command. And then, in Step 722, the server 701 uses the AI encoding module to reduce the resolution of the raw images in order to obtain the source images of the first resolution and also encode these source images in order to form the encoded images. Wherein the AI encoding module comprises at least one predefined AI encoding algorithm. The at least one predefined AI encoding algorithm comprises a plurality of encoding weighted parameters. Then, the encoded images are transmitted as a video streaming to the client device 720 (Step 714). In this embodiment, the AI enhance module of the client device 702 further comprises an AI decoding algorithm for decoding the accepted encoded images into the decoded images. That is, the AI decoding algorithm, the first predefined AI algorithm, the second predefined AI algorithm, the first weighted parameters and the second weighted parameters are all included in the AI enhance module of the client device 702 for processing the encoded images at once in order to obtain the enhanced images having the second resolution. Therefore, in Step 723, the AI enhance module of the client device 702 accepts and processes the decoded images by using the AI decoding algorithm, the first predefined AI algorithm, the second predefined AI algorithm, the first weighted parameters and the second weighted parameters of the AI enhance module of the client device 702 in order to generate corresponding enhanced images having the second resolution. And then, the client device 702 outputs the enhanced images (Step 718) to a screen (display panel) as displayed output images.

Figure 27:
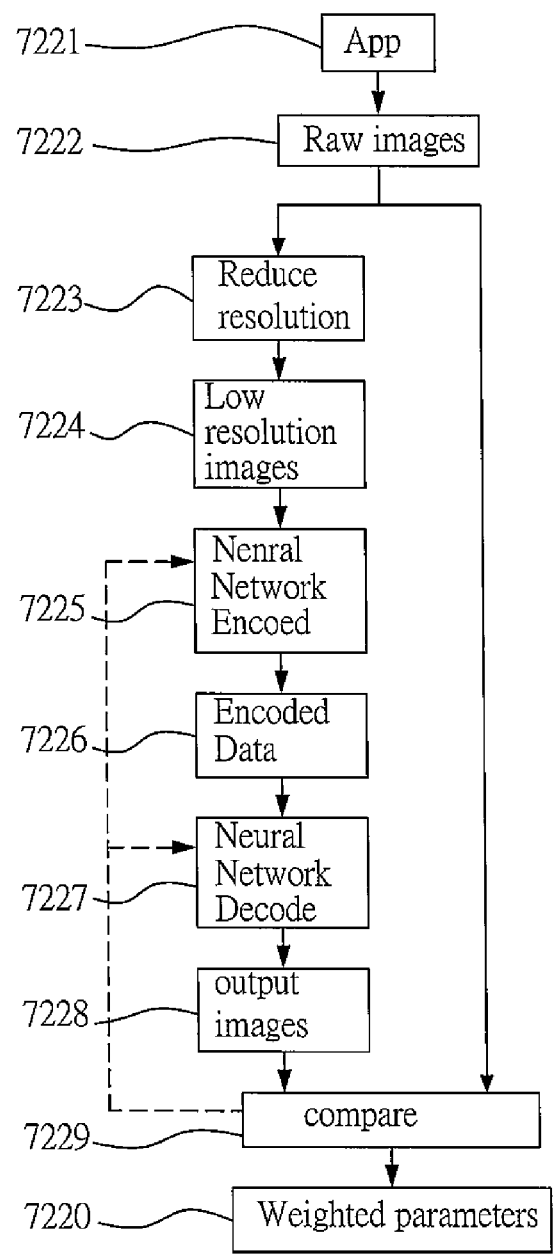
FIG. 27 is a schematic diagram showing an embodiment of the training process of the AI encoding algorithm, the AI decoding algorithm, the first predefined AI algorithm, the second predefined AI algorithm, the first weighted parameters and the second weighted parameters of the artificial neural network modules in accordance with the present invention.

FIG. 27 is a schematic diagram showing an embodiment of the training process of the AI encoding algorithm, the AI decoding algorithm, the first predefined AI algorithm, the second predefined AI algorithm, the first weighted parameters and the second weighted parameters of the artificial neural network modules in accordance with the present invention. In the present invention, the AI encoding algorithm and its weighted parameters, the AI decoding algorithm and its weighted parameters, the first predefined AI algorithm, the second predefined AI algorithm, the first weighted parameters and the second weighted parameters are all trained and defined at once by a training process of the artificial neural network modules performed in the training server. After the training process is completed, the AI encoding algorithm and its weighted parameters are applied to the AI encoding module executed in the server 701 for processing the Step 722 shown in FIG. 26; in addition, the AI decoding algorithm and its weighted parameters, the first predefined AI algorithm, the second predefined AI algorithm, the first weighted parameters and the second weighted parameters are all applied to the AI enhance module of the client device 702 for processing the Step 723 shown in FIG. 26. The training process of the AI encoding algorithm and its weighted parameters, the AI decoding algorithm and its weighted parameters, the first predefined AI algorithm, the second predefined AI algorithm, the first weighted parameters and the second weighted parameters executed in the training server comprises the following steps:

Step 7221: starting a training mode in the training server and executing the first application in the training mode to generate a plurality of training raw images. The training raw images have the second resolution (high resolution) (Step 7222).

Step 7223: performing a resolution reducing process for reducing the resolution of the training raw images from the second resolution down to the first resolution in order to generate a plurality of training low-resolution images having the first resolution (Step 7224).

Step 7225: using a first artificial neural network module to accept the training low-resolution images and encode the training low-resolution images one by one by using a training encoding algorithm in order to generate a plurality of training encoded images having the first resolution (Step 7226). The training encoding algorithm has a plurality of training encoding weighted parameters.

Step 7227: using a second artificial neural network module to accept the training encoded images and decode the training encoded images one by one by using a training decoding algorithm in order to generate a plurality of training output images having the second resolution (Step 7228). The training decoding algorithm has a plurality of training decoding weighted parameters.

Step 7229: using a compare module to compare the differences between the training output images and their corresponding training raw images one by one, so as to modify the training encoding weighted parameters and the training decoding weighted parameters according to the differences between each training output image and its corresponding training raw image. The training encoding weighted parameters and the training decoding weighted parameters are modified to minimize the differences between the training output images and their corresponding training raw images. Each time when the training encoding weighted parameters and the training decoding weighted parameters are modified, the modified training encoding weighted parameters and training decoding weighted parameters are respectively fed back to the training encoding algorithm and the training decoding algorithm for processing another (the next) training low-resolution image. Wherein, in Step 7220, after a predetermined amount of the training output images and their corresponding training raw images are compared, and a predetermined times of the training encoding weighted parameters and the training decoding weighted parameters are modified, the training encoding weighted parameters are applied to the predefined AI encoding algorithm of the AI encoding module in the server, in addition, the training decoding weighted parameters are applied to the predefined algorithms of the AI enhance module in the client device. Such that, the AI encoding module of the server is capable of performing the resolution reducing and encoding processes of the raw images at once in the "AI encoding" Step 722 of FIG. 26; in addition, the AI enhance module of the client device is capable of performing the decoding, resolution increasing and quality enhancing processes of the encoded images at once in "AI decoding with increasing resolution and enhancing" Step 723 of FIG. 26.

In a preferred embodiment of the invention, the AI enhance module of the client device 702 includes only one single set of predefined AI algorithm and weighted parameters which were trained by using the second artificial neural network module illustrated in Steps 7227 to 7229 of FIG. 27 in order to provide functions of the AI decoding, the AI increasing resolution and the AI enhancing quality to the decoded images as shown in Step 723 of FIG. 26.

In an embodiment of the invention, one of the following prior art artificial neural network technologies can be used to act as the first artificial neural network module for performing the AI encoding step in the server: Autoencoder (AE), Denoising autoencoder (DAE), Variational autoencoder (VAE), and Vector-Quantized Variational autoencoder (VQ-VAE). The second artificial neural network module for performing the AI decoding with increasing resolution and enhancing step in the client device can be chosen from one of the following prior art artificial neural network technologies: SRCNN, EDSR, RCAN, EnhanceNet, SRGAN, and ESRGAN.

In a preferred embodiment of the invention, the raw images generated by the first application executed in the server are three-dimensional (3D) images each containing a left-eye view and a right-eye view combined in one image frame in a side-by-side manner. Therefore, the output images generated by the client device are also 3D images.

In a preferred embodiment, the system for enhancing quality of media transmitted via network in accordance with the present invention can also be applied to a remote control system of a robot. The server of the invention can be a robot which includes a motion module, a camera module, a telecommunication module and a control module. The client device can be a control device which includes a controller module and a display module. The robot is remotely connected with the control device via internet or other wireless communication technologies. The controller module can be operated by a user in order to send control commands to the robot so as to remotely control and operate the motions and activities of the robot. The camera module of the robot includes a dual-eye image-capturing module in order to obtain 3D images (left-eye view and right-eye view combined in one image frame in a side-by-side manner). According to the control commands received from the control device, the robot can move and conduct other activities, and also capture 3D images of the surrounding environment of the robot, and then send these 3D images back to the control device and then display these 3D images on the display module. By using the method of enhancing quality of media in accordance with the present invention, the client device can be equipped with the AI enhance module, such that, the robot's dual-eye image-capturing module only needs to capture low-resolution images with a small amount of data and quickly send them to the client device, and then the client device can use the AI enhance module to restore the high-resolution 3D images.

While the present invention has been particularly shown and described with reference to a preferred embodiment, it will be understood by those skilled in the art that various changes in form and detail may be without departing from the spirit and scope of the present invention.

What is claimed is:

1. A method for enhancing quality of media, comprising:
providing a client device which includes an artificial intelligence (AI) enhance module; said AI enhance module comprising at least one predefined algorithm; said at least one predefined algorithm comprising a plurality of weighted parameters; said weighted parameters of the at least one predefined algorithm are defined in advance by a training process of an artificial neural network module executed in a training server;
the client device accepting a plurality of encoded images; said encoded images being obtained by encoding a plurality of source images of a first resolution; and
the client device decoding said accepted encoded images into a plurality of decoded images, and using the weighted parameters and the at least one predefined algorithm of the AI enhance module to process the decoded images in order to generate a plurality of enhanced images; wherein, said enhanced images have a second resolution which is higher than the first resolution;
wherein said enhanced images are capable of being output to a screen as displayed output images.

2. The method of claim 1, wherein the encoded images are generated by a server and transmitted to said client device as a video streaming via a network.

3. The method of claim 2, wherein the source images are generated by the server by executing a first application in the server according to at least one command.

4. The method of claim 3, wherein the source images are generated by the following steps:
executing the first application in the server; said first application generating a plurality of raw images according to said at least one command; the raw images have the second resolution; and
reducing the resolution of the raw images in order to obtain said source images of the first resolution; said source images being encoded by an encoder of the server to form said encoded images.

5. The method of claim 3, wherein said server includes an AI encoding module; the source images and the encoded images are generated by the following steps:
executing the first application in the server; said first application generating a plurality of raw images according to said at least one command; the raw images have the second resolution; and
using said AI encoding module to reduce the resolution of the raw images in order to obtain said source images of the first resolution and also encode said source images in order to form said encoded images;
wherein said AI encoding module comprising at least one predefined AI encoding algorithm; said at least one predefined AI encoding algorithm comprising a plurality of encoding weighted parameters.

6. The method of claim 3, further comprising the following steps before the client device accepting said encoded images:
executing a second application in the client device; the second application being relevant to and cooperative with the first application in such a manner that, the client device being operable by a user to generate said at least one command; and
said client device transmitting said at least one command to the server via the network, and receiving said encoded images from the server via the network according to the command.

7. The method of claim 5, wherein the training process of the artificial neural network module executed in the training server comprises:
starting a training mode in the training server to generate a plurality of training raw images; said training raw images have said second resolution;
performing a resolution reducing process for reducing the resolution of the training raw images from the second resolution down to the first resolution in order to generate a plurality of training low-resolution images having the first resolution;
using a first artificial neural network module to accept the training low-resolution images and encode said training low-resolution images one by one by using a training encoding algorithm in order to generate a plurality of training encoded images having the first resolution; said training encoding algorithm having a plurality of training encoding weighted parameters;
using a second artificial neural network module to accept the training encoded images and decode said training encoded images one by one by using a training decoding algorithm in order to generate a plurality of training output images having the second resolution; said training decoding algorithm having a plurality of training decoding weighted parameters;
using a compare module to compare the differences between the training output images and their corresponding training raw images one by one, so as to modify said training encoding weighted parameters and said training decoding weighted parameters according to the differences between each said training output image and its corresponding training raw image; said training encoding weighted parameters and said training decoding weighted parameters being modified to minimize the differences between the training output images and their corresponding training raw images; each time when said training encoding weighted parameters and said training decoding weighted parameters being modified, the modified said training encoding weighted parameters and said training decoding weighted parameters being fed back to the training encoding algorithm and the training decoding algorithm for processing another said training low-resolution image;
wherein, after a predetermined amount of the training output images and their corresponding training raw images are compared, and a predetermined times of the training encoding weighted parameters and said training decoding weighted parameters are modified, the training encoding weighted parameters are applied to the predefined AI encoding algorithm of the AI encoding module in the server, in addition, the training decoding weighted parameters are applied to the predefined algorithm of the AI enhance module in the client device in such a manner that, the AI enhance module of the client device is capable of performing the decoding, resolution increasing and quality enhancing processes of the accepted encoded images at once.

8. The method of claim 4, wherein the raw images are three-dimensional (3D) images each containing a left-eye view and a right-eye view combined in one image frame in a side-by-side manner.

9. The method of claim 1, wherein said at least one predefined algorithm comprises a first predefined AI algorithm and a second predefined AI algorithm; said first predefined AI algorithm comprises a plurality of first weighted parameters; said second predefined AI algorithm comprises a plurality of second weighted parameters;
  wherein, said first predefined AI algorithm and the first weighted parameters are capable of increasing resolution of images, such that the resolution of images processed by the first predefined AI algorithm and the first weighted parameters will be increased from the first resolution to the second resolution;
  wherein, said second predefined AI algorithm and the second weighted parameters are capable of enhancing quality of images, such that the quality of images processed by the second predefined AI algorithm and the second weighted parameters will be better than the decoded images.

10. The method of claim 9, wherein after the client device decodes said accepted encoded images into said decoded images, the client device first uses the first predefined AI algorithm and the first weighted parameters to process the decoded images in order to generate a plurality of resolution-increased images having the second resolution; and then, the client device uses the second predefined AI algorithm and the second weighted parameters to process the resolution-increased images in order to generate a plurality of said enhanced images having the second resolution.

11. The method of claim 9, wherein after the client device decodes said accepted encoded images into said decoded images, the client device first uses the second predefined AI algorithm and the second weighted parameters to process the decoded images in order to generate a plurality of said enhanced images having the first resolution; and then, the client device uses the first predefined AI algorithm and the first weighted parameters to process the enhanced images in order to generate a plurality of resolution-increased enhanced images having the second resolution.

12. The method of claim 9, wherein the first predefined AI algorithm, the second predefined AI algorithm, the first weighted parameters and the second weighted parameters are all included in said AI enhance module of the client device for processing said decoded images at once in order to obtain said enhanced images having the second resolution.

13. The method of claim 9, wherein said AI enhance module further comprises an AI decoding algorithm for decoding said accepted encoded images into said decoded images; wherein the AI decoding algorithm, the first predefined AI algorithm, the second predefined AI algorithm, the first weighted parameters and the second weighted parameters are all included in said AI enhance module of the client device for processing said accepted encoded images at once in order to obtain said enhanced images having the second resolution.

14. The method of claim 9, wherein the training process of the artificial neural network module executed in the training server comprises:
  starting a training mode in the training server to generate a plurality of training raw images; said training raw images have said second resolution;
  performing a resolution reducing process for reducing the resolution of the training raw images from the second resolution down to the first resolution in order to generate a plurality of training low-resolution images having the first resolution;
  said artificial neural network module accepting said training low-resolution images and processing said training low-resolution images one by one by using a first training algorithm in order to generate a plurality of training output images having the second resolution; said first training algorithm having a plurality of first training weighted parameters; and
  using a compare module to compare the differences between the training output images and their corresponding training raw images one by one, so as to modify said first training weighted parameters of said first training algorithm according to the differences between each said training output image and its corresponding training raw image; said first training weighted parameters being modified to minimize the differences between the training output images and their corresponding training raw images; each time when the first training weighted parameters being modified, the modified first training weighted parameters being fed back to the first training algorithm for processing another said training low-resolution image;
  wherein, after a predetermined amount of the training output images and their corresponding training raw images are compared, and a predetermined times of the first training weighted parameters are modified, the first training weighted parameters are applied to the first predefined algorithm of said AI enhance module of the client device.

15. The method of claim 9, wherein the training process of the artificial neural network module executed in the training server comprises:
  starting a training mode in the training server to generate a plurality of training raw images;
  encoding said training raw images into a plurality of training encoded images by using an encoder of the training server;
  decoding said training encoded images into a plurality of training decoded images by using a training decoder of the training server;
  said artificial neural network module accepting said training decoded images and processing said training decoded images one by one by using a second training algorithm in order to generate a plurality of training output images; said second training algorithm having a plurality of second training weighted parameters; and
  using a compare module to compare the differences between the training output images and their corresponding training raw images one by one, so as to modify said second training weighted parameters of said second training algorithm according to the differences between each said training output image and its corresponding training raw image; said second training weighted parameters being modified to minimize the differences between the training output images and their corresponding training raw images; each time when the second training weighted parameters being modified, the modified second training weighted parameters being fed back to the second training algorithm for processing another said training decoded image;
  wherein, after a predetermined amount of the training output images and their corresponding training raw images are compared, and a predetermined times of the second training weighted parameters are modified, the second training weighted parameters are applied to the second predefined algorithm of said AI enhance module of the client device.

16. The method of claim 9, wherein the training process of the artificial neural network module executed in the training server comprises:

starting a training mode in the training server to generate a plurality of training raw images; said training raw images have said second resolution;

performing a resolution reducing process for reducing the resolution of the training raw images from the second resolution down to the first resolution in order to generate a plurality of training low-resolution images having the first resolution;

encoding said training low-resolution images into a plurality of training encoded images by using an encoder of the training server;

decoding said training encoded images into a plurality of training decoded images by using a training decoder of the training server; said training decoded images having the first resolution;

said artificial neural network module accepting said training decoded images and processing said training decoded images one by one by using a first training algorithm and a second training algorithm in order to generate a plurality of training output images having the second resolution; said first training algorithm having a plurality of first training weighted parameters; said second training algorithm having a plurality of second training weighted parameters; and using a compare module to compare the differences between the training output images and their corresponding training raw images one by one, so as to modify said first training weighted parameters and said second training weighted parameters according to the differences between each said training output image and its corresponding training raw image; said first training weighted parameters and said second training weighted parameters being modified to minimize the differences between the training output images and their corresponding training raw images; each time when the first training weighted parameters and said second training weighted parameters being modified, the modified first training weighted parameters and said second training weighted parameters being fed back to the first training algorithm and the second training algorithm for processing another said training low-resolution image;

wherein, after a predetermined amount of the training output images and their corresponding training raw images are compared, and a predetermined times of the first training weighted parameters and said second training weighted parameters are modified, the first training weighted parameters and said second training weighted parameters are respectively applied to the first predefined algorithm the second predefined algorithm of said AI enhance module of the client device.

* * * * *